US012640598B2

(12) United States Patent
Shimura

(10) Patent No.: US 12,640,598 B2
(45) Date of Patent: May 26, 2026

(54) POWER RECEIVING DEVICE, POWER TRANSMITTING DEVICE, METHOD FOR THE SAME, AND STORAGE MEDIUM

(71) Applicant: CANON KABUSHIKI KAISHA, Tokyo (JP)

(72) Inventor: Hajime Shimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/925,881

(22) Filed: Oct. 24, 2024

(65) Prior Publication Data

US 2025/0055326 A1      Feb. 13, 2025

Related U.S. Application Data

(63) Continuation of application No. PCT/JP2023/015490, filed on Apr. 18, 2023.

(30) Foreign Application Priority Data

Apr. 26, 2022      (JP) ................................. 2022-072480

(51) Int. Cl.
| | |
|---|---|
| *H02J 50/80* | (2016.01) |
| *H02J 50/12* | (2016.01) |
| *H02J 50/60* | (2016.01) |
| *H02J 50/90* | (2016.01) |

(52) U.S. Cl.
CPC .............. *H02J 50/80* (2016.02); *H02J 50/12* (2016.02); *H02J 50/60* (2016.02); *H02J 50/90* (2016.02)

(58) Field of Classification Search
CPC .. H02J 50/80; H02J 50/12; H02J 50/60; H02J 50/90; H02J 7/00; H02J 50/10
See application file for complete search history.

(56) References Cited

U.S. PATENT DOCUMENTS

| | | | | |
|---|---|---|---|---|
| 11,735,959 B2 * | 8/2023 | Yoshida | .................. | H02J 50/12 |
| | | | | 307/104 |
| 2013/0134792 A1 * | 5/2013 | Bunsen | .................. | G01R 27/04 |
| | | | | 324/633 |
| 2015/0115731 A1 * | 4/2015 | Wakabayashi | .......... | H02J 50/70 |
| | | | | 307/104 |
| 2018/0141443 A1 * | 5/2018 | Lee | ....................... | H02J 7/0042 |
| 2019/0067992 A1 | 2/2019 | Liu | | |
| 2021/0001732 A1 * | 1/2021 | Il | .............................. | B60M 7/00 |

FOREIGN PATENT DOCUMENTS

| | | |
|---|---|---|
| JP | 2013115981 A | 6/2013 |
| JP | 2015089267 A | 5/2015 |
| WO | 2018159732 A1 | 9/2018 |

* cited by examiner

*Primary Examiner* — Daniel Cavallari
*Assistant Examiner* — Michael J Warmflash
(74) *Attorney, Agent, or Firm* — Canon U.S.A., Inc. IP Division

(57)      ABSTRACT
A power receiving device includes: power receiving unit configured to receive power wirelessly from a power transmitting device; receiving unit configured to receive first information related to a voltage of an inverter included in the power transmitting device from the power transmitting device; and transmitting unit configured to transmit a specific signal to the power transmitting device on the basis of second information which is determined on the basis of the first information, the power transmitting device that has received the specific signal restricting the voltage of the inverter.

11 Claims, 23 Drawing Sheets

VOLTAGE VALUE OR
CURRENT VALUE

TIME

POWER RECEIVING DEVICE, POWER TRANSMITTING DEVICE, METHOD FOR THE SAME, AND STORAGE MEDIUM

CROSS REFERENCE OF RELATED APPLICATIONS

This application is a Continuation of International Patent Application No. PCT/JP2023/015490, filed Apr. 18, 2023, which claims the benefit of Japanese Patent Application No. 2022-072480, filed Apr. 26, 2022, both of which are hereby incorporated by reference herein in their entirety.

BACKGROUND

Field

The present disclosure relates to a technology of wireless power transmission.

Description of the Related Art

In a wireless power transmission system using a wireless power transmission technology, it is necessary to detect presence/absence of an object (hereinafter, referred to as a foreign matter in some cases) that is different from a power receiving device between a power transmitting device and the power receiving device. Japanese Patent Laid-Open No. 2013-115981 discloses a method by which it is possible to detect a metal foreign matter that is present near a coil without newly providing a sensor and to improve accuracy of the detection. Changes in a coupling coefficient k and a Q factor of resonance in a power transmitting coil are used to detect an electromagnetically coupled state (hereinafter, also simply referred to as a "coupled state") between a power transmitting coil and a power receiving coil.

In the related art, a method of appropriately performing control on the basis of detection results obtained by using a plurality of state detection methods together in a case where the plurality of state detection methods can be performed to perform wireless power transmission has not been established.

SUMMARY OF THE DISCLOSURE

The present disclosure provides techniques for performing control to address positional deviation between a power transmitting and a power receiving antenna, or performing control to address an object that may affect wireless power transmission.

A power receiving device according to an embodiment of the present disclosure includes: power receiving unit configured to receive power wirelessly from a power transmitting device; receiving unit configured to receive first information related to a voltage of an inverter included in the power transmitting device from the power transmitting device; and transmitting unit configured to transmit a specific signal to the power transmitting device on the basis of second information which is determined on the basis of the first information, wherein the power transmitting device that has received the specific signal restricts the voltage of the inverter. Further, features of the present disclosure will become apparent from the following description of exemplary embodiments with reference to the attached drawings.

BRIEF DESCRIPTION OF THE DRAWINGS

FIG. 3 is a diagram illustrating a configuration example of a power receiving device.

FIGS. 11A and 11B are explanatory diagrams of a Q factor measuring method.

DESCRIPTION OF THE EMBODIMENTS

Hereinafter, embodiments of the present disclosure will be described in detail with reference to the accompanying drawings. In the embodiments, a wireless power-charging system to which a wireless power transmission system is applied will be described. Wireless power transmission based on a standard defined by the Standards Organization Wireless Power Consortium for wireless power-charging (hereinafter, referred to as WPC standard) will be described as an example.

First Embodiment

Figure 1:
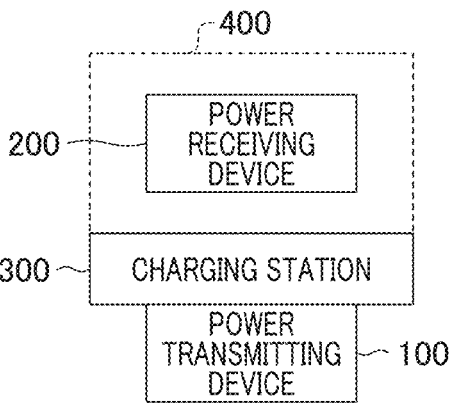
FIG. 1 is a diagram illustrating a configuration example of a wireless power transmission system.

FIG. 1 is a diagram illustrating a configuration example of a wireless power-charging system. The system includes a power transmitting device 100, a power receiving device 200, and a charging station 300. Hereinafter, the power receiving device 200 may be referred to as RX, and the power transmitting device 100 may be referred to as TX for simple description. Detailed configurations of TX and RX will be described later using FIGS. 2 and 3.

RX is an electronic device that receives power from TX and charges an incorporated battery in a state where RX is placed on the charging station 300. TX is an electronic device that wirelessly transmits power to RX placed on the charging station 300. Since the charging station 300 constitutes a part of TX, the situation in which RX "is placed on the charging station 300" may be described as "being placed on TX" below. A spatial range in which RX can receive power from TX is schematically illustrated by a range of a dotted-line frame 400 in FIG. 1.

RX and TX may have functions of executing applications other than the wireless charging function. For example, RX is a smartphone, and TX is an accessory device for charging a battery of the smartphone. However, RX and TX are not limited to the examples and may be tablet devices, storage devices such as hard disk devices and memory devices, or information processing devices such as personal computers (PCs). Also, RX and TX may be imaging devices such as still cameras or video cameras, automobiles, robots, medical devices, printers, or the like.

Figure 2:
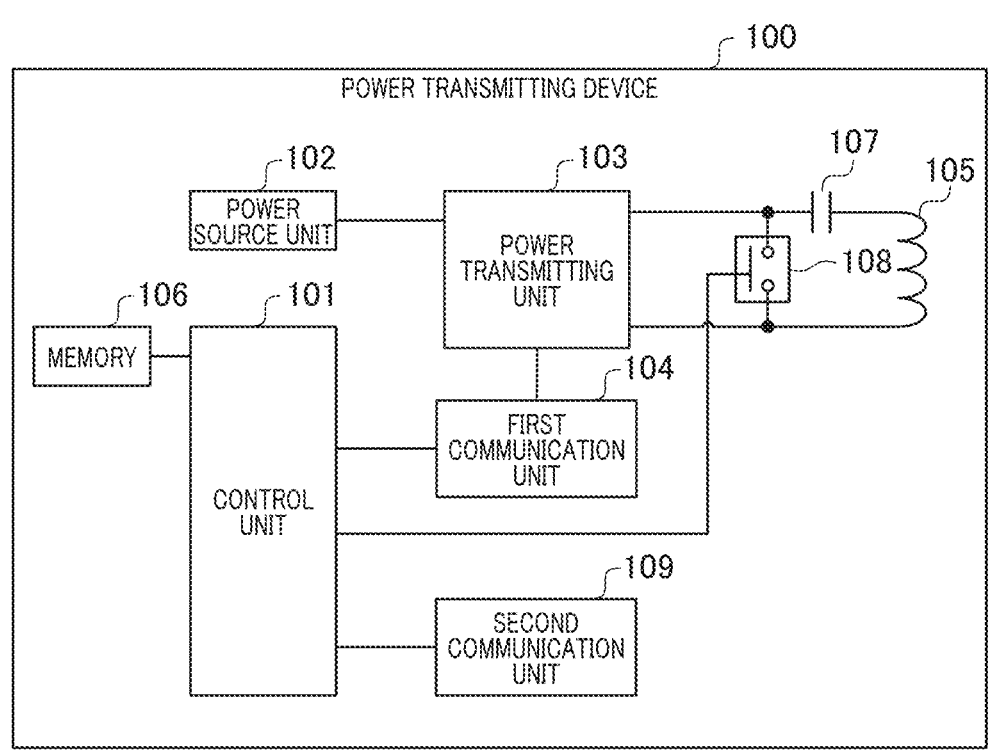
FIG. 2 is a diagram illustrating a configuration example of a power transmitting device.

Next, a configuration example of the power transmitting device 100 will be described with reference to FIG. 2. FIG. 2 is a functional block diagram illustrating a configuration example of the power transmitting device 100 (TX). TX includes a control unit 101, a power source unit 102, a power transmitting unit 103, a first communication unit 104, a power transmitting antenna 105, a memory 106, a resonance capacitor 107, a switch unit 108, and a second communication unit 109. Although each functional block element is illustrated as a separate element in FIG. 2, a plurality of arbitrary functional block elements may be mounted on the same chip.

The control unit 101 controls entire TX by executing a control program stored in the memory 106. Also, the control unit 101 performs power transmission control including communication for authenticating a device in TX. Furthermore, the control unit 101 can perform control to execute applications other than the wireless power transmission. The control unit 101 is configured to include one or more processors such as a central processing unit (CPU), a microprocessor unit (MPU), or the like. Alternatively, the control unit 101 may be configured of hardware such as an application specific integrated circuit (ASIC). Moreover, the control unit 101 may be configured to include an array circuit such as a field programmable gate array (FPGA) compiled to execute predetermined processing. The control unit 101 can execute processing of causing the memory 106 to store information to be stored during execution of various kinds of processing and time counting processing using a timer (not illustrated).

The power source unit 102 performs power supply to each functional block element. The power source unit 102 includes, for example, a circuit for power connection to a commercial power source and a battery. The battery accumulates power supplied from the commercial power source.

The power transmitting unit 103 converts AC or DC power input from the power source unit 102 into AC power in a frequency band used for wireless power transmission, inputs the AC power to the power transmitting antenna 105, and thereby causes an electromagnetic wave to be received by RX. For example, the power transmitting unit 103 includes an inverter and converts a DC voltage supplied by the power source unit 102 into an AC voltage by a switching circuit with a half-bridge configuration or a full-bridge configuration. The power transmitting unit 103 includes a plurality of field effect transistors (FETs) constituting a bridge and a gate driver that controls ON/OFF of the plurality of FETs.

The power transmitting unit 103 controls a strength of an electromagnetic wave to be output by adjusting one or both of a voltage (power transmission voltage) and a current (power transmitting current) to be input to the power transmitting antenna 105. How large the power transmission voltage or the power transmitting current is controls how strong the electromagnetic wave is. The control unit 101 controls a start and a stop of power transmission and the strength of the electromagnetic wave to be output by providing an instruction to the power transmitting unit 103. The power transmitting unit 103 performs output control of power of an AC frequency such that power transmission of the power transmitting antenna 105 is started or stopped or the strength of the electromagnetic wave to be output is controlled on the basis of an instruction signal from the control unit 101. Also, the power transmitting unit 103 is assumed to have a power supply capability to output power of 15 watts (W) to the charging unit (FIG. 3: 206) of the power receiving device 200 (RX) compatible with the WPC standard.

The first communication unit 104 is connected to the control unit 101 and the power transmitting unit 103 and performs communication for power-transmission control based on the WPC standard between itself and RX. The first communication unit 104 performs frequency shift keying on the electromagnetic wave output from the power transmitting antenna 105, transmits information to RX, and performs communication. Also, the first communication unit 104 demodulates the electromagnetic wave transmitted from the power transmitting antenna 105, on which RX has performed modulation, and acquires information transmitted by RX. The communication by the first communication unit 104 is performed by superimposing a signal for communication on the electromagnetic wave transmitted from the power transmitting antenna 105.

The memory 106 can store information regarding states of TX and RX in addition to storing of the control program. The information regarding the states of TX and RX is a transmitted power value, a received power value, and the like. The information regarding the state of TX is acquired by the control unit 101. The information regarding the state of RX is acquired by the control unit (FIG. 3: 201) of RX and can be received by the first communication unit 104.

The switch unit 108 is connected to a serial circuit of the resonance capacitor 107 and the power transmitting antenna 105 in parallel. The control unit 101 transmits a control signal to the switch unit 108 and performs ON/OFF control thereof. The power transmitting antenna 105 is connected to the resonance capacitor 107. In a case where the switch unit 108 is brought into an ON state and is short-circuited due to a control signal from the control unit 101, the power transmitting antenna 105 and the resonance capacitor 107 form a serial resonance circuit and resonate at a specific frequency f1. At this time, a current flows through a closed circuit formed by the power transmitting antenna 105, the resonance capacitor 107, and the switch unit 108. On the other hand, once the switch unit 108 is brought into an OFF state and the circuit is opened due to a control signal from the control unit 101, power is supplied from the power transmitting unit 103 to the power transmitting antenna 105 and the resonance capacitor 107.

The second communication unit 109 is connected to the control unit 101 and performs communication based on a standard that is different from the WPC standard between itself and RX. For example, the second communication unit 109 communicates with RX (a second communication unit 212 in FIG. 3) using an antenna that is different from the power transmitting antenna 105. Examples thereof include a wireless local area network (LAN), Bluetooth (registered trademark) Low Energy (BLE), and near field communication (NFC).

In regard to communication between TX and RX, TX may perform communication with RX by selectively using any of a plurality of communication standards. Communication forms selectively using a plurality of communication modes described below are possible.

Figure 3:
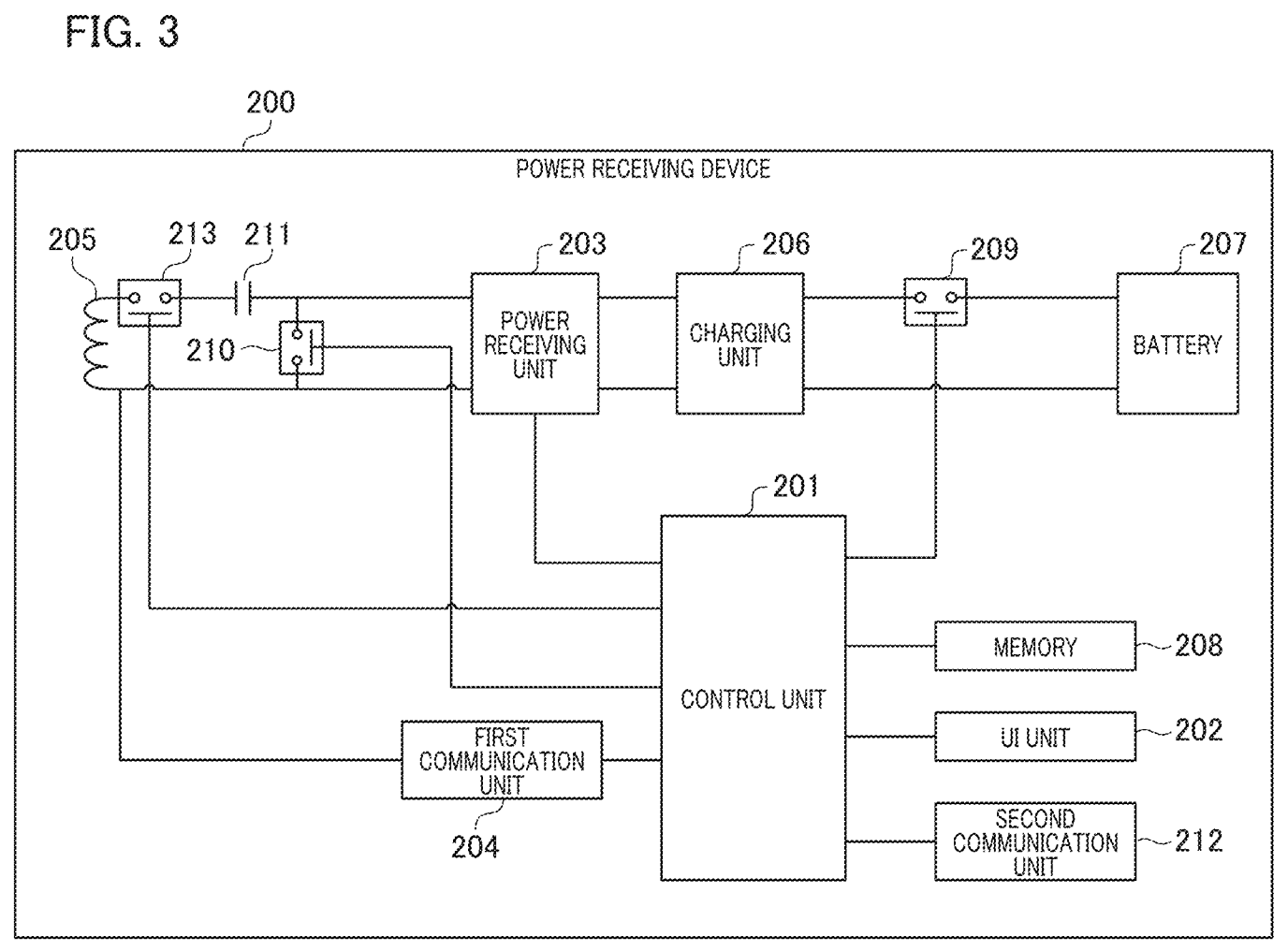

Communication based on a first standard (WPC standard) performed between the first communication unit 104 of TX and a first communication unit 204 (FIG. 3) of RX Communication based on a second standard (a standard other than the WPC standard) performed between the second communication unit 109 of TX and the second communication unit 212 (FIG. 3) of RX Next, a configuration example of the power receiving device 200 will be described with reference to FIG. 3. FIG. 3 is a block diagram illustrating a configuration example of the power receiving device 200 (RX). RX includes a control unit 201, a user interface (hereinafter, referred to as a UI) unit 202, a power receiving unit 203, the first communication unit 204, a power receiving antenna 205, a charging unit 206, a battery 207, and a memory 208. RX further includes a first switch unit 209, a second switch unit 210, a resonance capacitor 211, the second communication unit 212, and a third switch unit 213. Note that the plurality of functional block elements illustrated in FIG. 3 may be realized by one hardware module.

The control unit 201 controls each functional block element of RX by executing a control program stored in the memory 208. Furthermore, the control unit 201 can perform control to execute applications other than wireless power transmission. The control unit 201 is configured to include one or more processors such as a CPU, an MPU, or the like. Also, it is possible to control the entire RX (for example, the entire smartphone) in cooperation with an operating system (OS) that the control unit 201 executes. Alternatively, the control unit 201 is configured of hardware such as an ASIC or is configured to include an array circuit such as an FPGA compiled to execute predetermined processing. The control unit 201 can cause the memory 208 to store information to be stored during execution of various kinds of processing and execute time counting processing using a timer (not illustrated).

The UI unit 202 is connected to the control unit 201 and provides various outputs to a user. The various outputs are operations such as screen display, blinking or a color changing of a light emitting diode (LED), sound output through a speaker, vibration of an RX main body, and the like. The UI unit 202 is realized by a liquid crystal panel, a speaker, a vibration motor, or the like.

The power receiving unit 203 acquires AC power (an AC voltage and an AC current) generated through electromagnetic induction based on the electromagnetic wave emitted from the power transmitting antenna 105 of TX via the power receiving antenna 205. Then, the power receiving unit 203 converts the AC power to DC power or AC power of a predetermined frequency and outputs it to the charging unit 206. The charging unit 206 charges the battery 207. The power receiving unit 203 includes a rectification unit (rectifier) and a voltage control unit necessary to supply power against loads on RX. The power receiving unit 203 supplies power for charging from the charging unit 206 to the battery 207. The power receiving unit 203 is assumed to have an capability of supplying power to output power of 15 watts to the charging unit 206.

The first communication unit 204 performs communication for power receiving control based on the WPC standard between itself and the first communication unit 104 included in TX. The first communication unit 204 is connected to the power receiving antenna 205 and the control unit 201. The first communication unit 204 demodulates an electromagnetic wave input from the power receiving antenna 205 and acquires information transmitted from TX. The first communication unit 204 performs load modulation or amplitude modulation on the input electromagnetic wave, superimposes a signal related to information to be transmitted to TX on the electromagnetic wave, and thereby performs communication with TX.

The memory 208 stores information and the like related to states of TX and RX in addition to storing the control program. The information related to the state of RX is acquired from the control unit 201. Also, the information related to the state of TX is acquired from the control unit 101 of TX and can be received by the first communication unit 204 or the second communication unit 212.

The first switch unit 209 is provided between the charging unit 206 and the battery 207 and is controlled by the control unit 201. The first switch unit 209 has a function of controlling whether or not to supply power received by the power receiving unit 203 to the battery 207 and a function of controlling a load value. In a case where the control unit 201 brings the first switch unit 209 into the OFF state and opens the first switch unit 209, the power received by the power receiving unit 203 is not supplied to the battery 207. In a case where the control unit 201 brings the first switch unit 209 into the ON state and short-circuits the first switch unit 209, the power received by the power receiving unit 203 is supplied to the battery 207.

Although the first switch unit 209 is disposed between the charging unit 206 and the battery 207 in the example in FIG. 3, the first switch unit 209 may be disposed between the power receiving unit 203 and the charging unit 206. Alternatively, the first switch unit 209 may be disposed between a closed circuit formed by the power receiving antenna 205, the resonance capacitor 211, and the second switch unit 210 and the power receiving unit 203. In this case, the first switch unit 209 has a function of controlling whether or not to supply the power received by the power receiving unit 203 to the power receiving unit 203.

In addition, although the first switch unit 209 is illustrated as one functional block element in the example in FIG. 3, it is possible to realize the first switch unit 209 as a part of the charging unit 206 or the power receiving unit 203. Also, the first switch unit 209 is not limited to the configuration in which the first switch unit 209 is inserted in series between the charging unit 206 and the battery 207, and the first switch unit 209 may be inserted in parallel between the charging unit 206 and the battery 207. In this case, in a case where the control unit 201 brings the first switch unit 209 into the OFF state and opens the first switch unit 209, the power received by the power receiving unit 203 is supplied to the battery 207. In a case where the control unit 201 brings the first switch unit 209 into the ON state and short-circuits the first switch unit 209, the power received by the power receiving unit 203 is not supplied to the battery 207.

The second switch unit 210 is connected to the resonance capacitor 211 in parallel on the input side of the power receiving unit 203. The resonance capacitor 211 is connected to the power receiving antenna 205 via the third switch unit 213. The second switch unit 210 and the third switch unit 213 are controlled by the control unit 201. The third switch unit 213 has a function of controlling whether or not to open a terminal of the power receiving antenna 205. In a case where the control unit 201 brings the third switch unit 213 into the OFF state, the terminal of the power receiving antenna 205 is brought into an open state. In a case where the control unit 201 brings the third switch unit 213 into the ON state, the power receiving antenna 205 is connected to the power receiving unit 203 via the resonance capacitor 211.

In a case where the control unit 201 brings the third switch unit 213 into the ON state, and the second switch unit 210 is brought into the ON state and is short-circuited, the power receiving antenna 205 and the resonance capacitor 211 form a serial resonance circuit and resonate at a specific frequency f2. A current flows through a closed circuit formed by the power receiving antenna 205, the resonance capacitor 211, and the second switch unit 210, and no current flows through the power receiving unit 203. Then, once the second switch unit 210 is brought into the OFF state, and the circuit is opened, the power received by the power receiving antenna 205 and the resonance capacitor 211 is supplied to the power receiving unit 203. Note that the second switch unit 210 is not limited to the example in FIG. 3 and may be disposed between the power receiving antenna 205 and the resonance capacitor 211. In a case where the third switch unit 213 is in the ON state, and the second switch unit 210 is in the ON state, the terminal of the power receiving antenna 205 is short-circuited. Also, the third switch unit 213 may be disposed between the resonance capacitor 211 and the power receiving unit 203.

In the present system, TX and RX perform wireless power transmission based on the WPC standard between the power transmitting antenna 105 and the power receiving antenna 205. In the WPC standard, the magnitude of the power secured when the power receiving device 200 receives power from the power transmitting device 100 is defined by a value called Guaranteed Power (hereinafter, referred to as "GP"). For example, GP indicates a power value secured to be output to the loads of the power receiving device 200 even if power transmission efficiency between the power receiving antenna 205 and the power transmitting antenna 105 is degraded due to variations in positional relationship between the power receiving device 200 and the power transmitting device 100. The loads of the power receiving device 200 are the charging unit 206, the battery 207, and the like in FIG. 3, and the value of GP corresponds to the amount of power secured to be output from the power receiving unit 203. A case where GP is 5 (watts) and the positional relationship between the power receiving antenna 205 and the power transmitting antenna 105 varies, for example, is assumed. In this case, power-transmission control is performed such that the power transmitting device 100 can output 5 watts to the loads of the power receiving device 200 even if the power transmission efficiency is degraded. Also, GP is determined through negotiation performed by the power transmitting device 100 and the power receiving device 200. Note that the present embodiment is not limited to GP and can be applied to a configuration in which transmission and reception of power determined through mutual negotiation between the power transmitting device and the power receiving device are performed.

Also, a case where an object is present in the vicinity of the power transmitting device 100 when power is transmitted from the power transmitting device 100 to the power receiving device 200 is assumed. The object in this case is an object that may affect power transmission from the power transmitting device 100 to the power receiving device 200 and is an object that is different from the power receiving device 200 (foreign matter). The electromagnetic wave for power transmission may affect the foreign matter, and a temperature rise or breakage of the foreign matter may occur. The foreign matter in the present disclosure is, for example, a clip or an IC card. An object that may unintentionally generate heat when the object is exposed to radio power transmitted by the power transmitting antenna from among objects that are essential for the power receiving device or a product incorporating the power receiving device or the power transmitting device or a product incorporating the power transmitting device is not a foreign matter.

In the WPC standard, a method of curbing occurrence of a temperature rise and breakage of the foreign matter by stopping power transmission in a case where the foreign matter is present is defined. Specifically, the power transmitting device 100 can detect presence of the foreign matter on the charging station 300. A Power Loss method is a method of detecting a foreign matter on the basis of a difference between power transmitted by the power transmitting device 100 and power received by the power receiving device 200. Also, a Q factor measuring method is a method of detecting a foreign matter on the basis of a change in quality coefficient (Q factor) of the power transmitting antenna 105 (power transmitting coil) of the power transmitting device 100. However, the foreign matter detected by the power transmitting device 100 in the present embodiment is not limited to an object that is present on the charging station 300. The power transmitting device 100 can detect the foreign matter located in the vicinity of the power transmitting device 100. For example, the power transmitting device 100 can detect the foreign matter that is located within a range in which power transmission can be performed.

Figure 4:
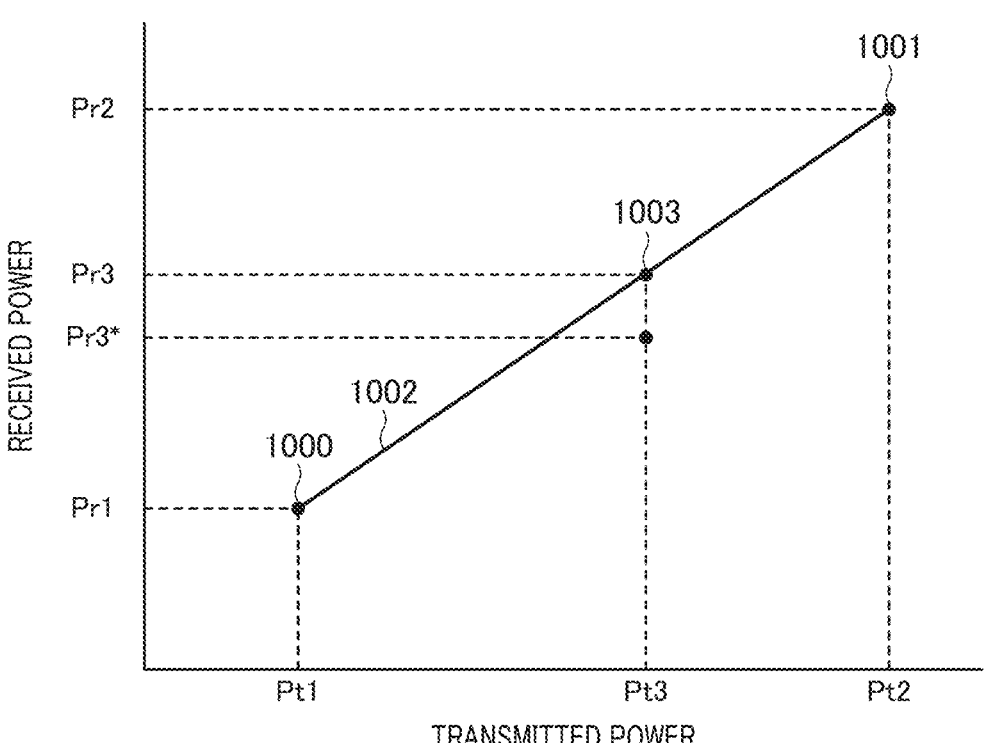
FIG. 4 is an explanatory diagram of a threshold value setting method in state detection based on a Power Loss method.

Foreign matter detection based on the Power Loss method defined by the WPC standard will be explained with reference to FIG. 4. In FIG. 4, the horizontal axis represents power transmitted by the power transmitting device 100, and the vertical axis represents the power received by the power receiving device 200. On a graph line indicated by a straight line segment 1002, a point 1000 corresponds to a first transmitted power value Pt1 and a first received power value Pr1, and a point 1001 corresponds to a second transmitted power value Pt2 and a second received power value Pr2. On the graph line, a point 1003 corresponds to a third transmitted power value Pt3 and a third received power value Pr3. The foreign matter as a detection target is a conductive metal piece or the like.

First, the power transmitting device 100 transmits power to the power receiving device 200 at the first transmitted power value Pt1, and the power receiving device 200 receives the power at the first received power value Pr1. Hereinafter, the state will be referred to as a Light Load state. Then, the power transmitting device 100 stores the first transmitted power value Pt1. Here, the first transmitted power value Pt1 and the first received power value Pr1 are predefined minimum transmitted power value and received power value. At this time, the power receiving device 200 performs load control such that received power is the minimum power. For example, the power receiving device 200 may disconnect the loads from the power receiving antenna 205 such that the received power is not supplied to the loads (the charging unit 206, the battery 207, and the like in FIG. 3). These can be realized by controlling the aforementioned first switch unit 209. Subsequently, the power receiving device 200 notifies the power transmitting device 100 of the first received power value Pr1. The power transmitting device 100 that has received a signal related to the first received power value Pr1 from the power receiving device 200 calculates a power loss between the power transmitting device 100 and the power receiving device 200. The power loss at this time is Pt1−Pr1 (=Ploss1). It is possible to create a calibration point (hereinafter, abbreviated as CP) 1000 indicating correspondence between Pt1 and Pr1.

Subsequently, the power transmitting device 100 changes the transmitted power value to a second transmitted power value Pt2 and transmits power to the power receiving device 200, and the power receiving device 200 receives the power at the second received power value Pr2. Hereinafter, the state will be referred to as a Connected Load state. Also, the power transmitting device 100 stores the second transmitted power value Pt2. Here, the second transmitted power value Pt2 and the second received power value Pr2 are the maximum transmitted power value and received power value defined in advance. At this time, the power receiving device 200 performs load control such that the received power is the maximum power. For example, the power receiving device 200 connects the power receiving antenna 205 and the loads such that the received power is supplied to the loads. These can be realized by controlling the aforementioned first switch unit 209. Subsequently, the power receiving device 200 notifies the power transmitting device 100 of the second received power value Pr2. The power transmitting device 100 that has received a signal related to the second received power value Pr2 from the power receiving device 200 calculates a power loss between the power transmitting device 100 and the power receiving device 200. The power loss at this time is Pt2−Pr2 (=Ploss2). It is possible to generate CP 1001 indicating correspondence between Pt2 and Pr2.

The power transmitting device 100 executes linear interpolation processing between CP 1000 and CP 1001 and generates a line segment 1002. The line segment 1002 indicates a relationship between transmitted power and received power in a state (hereinafter, referred to as a first detection state) detected as no foreign matters being present in the vicinity of the power transmitting device 100 and the power receiving device 200. The power transmitting device 100 can estimate a value of power received by the power receiving device 200 in a case where power is transmitted at predetermined transmitted power in the first detection state on the basis of the line segment 1002. For example, a case where the power transmitting device 100 transmits power at the third transmitted power value Pt3 is assumed. In this case, the power transmitting device 100 can estimate the third received power value Pr3 of the power received by the power receiving device 200 from the point 1003 corresponding to Pt3 on the line segment 1002. As described above, it is possible to obtain the power loss between the power transmitting device 100 and the power receiving device 200 in accordance with the loads on the basis of a plurality of combinations between the transmitted power value of the power transmitting device 100 and the received power value of the power receiving device 200 measured while the loads are changed. Also, it is possible to estimate the power loss between the power transmitting device 100 and the power receiving device 200 in accordance with all the loads through interpolation processing from a plurality of combinations of the transmitted power value and the received power value. Calibration processing performed by the power transmitting device 100 and the power receiving device 200 in order for the power transmitting device 100 to obtain the combination of the transmitted power value and the received power value in this manner will be referred to as "Calibration processing based on the Power Loss method". In addition, the Calibration processing will be abbreviated as CAL processing.

A case where the power transmitting device 100 actually transmits power to the power receiving device 200 at the third transmitted power value Pt3 after the CAL processing based on the Power Loss method and the power transmitting device 100 receives a signal related to a received power value Pr3* from the power receiving device 200 is assumed. The power transmitting device 100 subtracts the received power value Pr3* actually received from the power receiving device 200 from the received power value Pr3 in the first detection state and calculates Pr3−Pr3* (=Ploss_FO). Ploss_FO can be estimated as power consumed by a foreign matter, that is, a power loss in a case where the foreign matter is present in the vicinity of the power transmitting device 100 and the power receiving device 200. Hereinafter, the state detected as a foreign matter being present in the vicinity of the power transmitting device 100 and the power receiving device 200 will be referred to as a second detection state.

In the second detection state, the power transmitting device 100 compares the power loss Ploss_FO that is considered to have been consumed by the foreign matter with a threshold value determined in advance. In a case where the value of the power loss Ploss_FO exceeds the threshold value, the power transmitting device 100 can determine that the foreign matter is present. Alternatively, the power transmitting device 100 acquires the third received power value Pr3 in the first detection state from the power receiving device 200 and obtains the power loss Pt3−Pr3 (=Ploss3) between the power transmitting device 100 and the power receiving device 200 in advance. Next, the power transmitting device 100 acquires the received power value Pr3* from the power receiving device 200 in the second detection state and calculates the power loss Pt3−Pr3* (=Ploss3*) between the power transmitting device 100 and the power receiving device 200 in the second detection state. Then, the power transmitting device 100 can estimate the power loss Ploss_FO using Ploss3*−Ploss3.

As described above, there are two methods as methods of calculating Ploss_FO in the second detection state.

A first method of calculating Ploss_FO from Pr3−Pr3*

A second method of calculating Ploss_FO from Ploss3*−Ploss3

Although the second method will be basically described in the present embodiment, it is also possible to apply the content of the present embodiment to the first method.

RX and TX in the present embodiment perform communication to power transmission and reception control based on the WPC standard. In the WPC standard, a plurality of phases including a Power Transfer Phase in which power transmission is executed and one or more phases before actual power transmission are defined. In each phase, communication for necessary power transmission and reception control is performed. For example, foreign matter detection based on the Power Loss method is performed in the Power Transfer Phase on the basis of data obtained in a Calibration Phase. In addition, foreign matter detection based on the Q factor measuring method is performed before power transmission (before Digital Ping transmission and in a Negotiation Phase or a Renegotiation Phase).

Phases before power transmission based on the WPC standard include a Selection Phase, a Ping Phase, an Identification and Configuration Phase (Configuration Phase), a Negotiation Phase, and a Calibration Phase. Hereinafter, the Identification and Configuration Phase (Configuration Phase) will be referred to as an I&C Phase. Hereinafter, processing in each phase will be described.

In the Selection Phase, TX intermittently transmits Analog Ping and detects that an object has been placed on the charging station of TX. For example, placement of RX, a conductive piece, or the like on the charging station is detected. TX detects one of or both a voltage value and a current value of the power transmitting antenna 105 when Analog Ping is transmitted. In a case where the voltage value is below a threshold value, or in a case where the current value exceeds a threshold value, TX determines that an object is present and moves on to the Ping Phase.

In the Ping Phase, TX transmits Digital Ping with a large power than Analog Ping. The magnitude of the power of Digital Ping is sufficient power for the control unit of RX placed on TX to be activated. RX notifies TX of the received voltage value. In this manner, TX recognizes that the object detected in the Selection Phase is RX by receiving a response from RX that has received Digital Ping. Once TX receives the notification of the received voltage value, TX moves on to the I&C Phase. Also, TX measures the Q factor of the power transmitting antenna 105 using Analog Ping, for example, before transmission of Digital Ping. The measurement result is used to execute foreign matter detection processing using the Q factor measuring method.

In the I&C Phase, TX identifies RX and acquires device configuration information (capability information) from RX. RX transmits signals of an ID Data Packet and a Configuration Data Packet. The ID Data Packet includes identifier information of RX, and the Configuration Data Packet includes device configuration information (capability information) of RX. TX that has received the signals of the ID Data Packet and the Configuration Data Packet provides a response with acknowledgement (positive response ACK). Then, the I&C Phase ends.

In the Negotiation Phase, a value of GP is determined on the basis of a value of GP required by RX, a power transmission capability of TX, and the like. Also, TX receives, from RX, an FOD Status Data Packet including a Reference Quality Factor Value and a Reference Resonance Frequency Value. The Reference Quality Factor Value is a Q-factor that can be measured by a terminal of a power transmitting antenna of a text TX in a case where RX is placed on the test TX and no foreign matters are present nearby. In addition, the Reference Resonance Frequency Value is a resonance frequency that can be measured by a terminal of the power transmitting antenna of the test TX in a case where RX is placed on the test TX and no foreign matters are present nearby. In the Q factor measuring method, presence/absence of a foreign matter is determined on the basis of a threshold value with reference to the Reference Quality Factor Value and the Reference Resonance Frequency Value. TX executes foreign matter detection processing using the Q factor measuring method in response to a request from RX. In the WPC standard, a method of moving on to the Power Transfer Phase once and then performing processing similar to that in the Negotiation Phase again in response to a request from RX is defined. A phase in which such processing is performed after moving on from the Power Transfer Phase is referred to as a Renegotiation Phase.

In the Calibration Phase, the CAL processing is performed on the basis of the WPC standard. Also, RX notifies TX of a predetermined received power value and performs adjustment for TX to efficiently transmit power. The predetermined received power value is a received power value in the Light Load state or the maximum load state (Connected Load state), for example. The received power value provided through the notification to TX is used for foreign matter detection processing based on the Power Loss method.

In the Power Transfer Phase, TX and RX perform control for starting and continuing power transmission, error processing, stopping of power transmission due to full charging, and the like. TX and RX perform communication processing for such power transmission and reception control. For example, communication is performed by superimposing a signal on an electromagnetic wave transmitted from the power transmitting antenna 105 or the power receiving antenna 205 using the power transmitting antenna 105 and the power receiving antenna 205 that is used to perform wireless power transmission based on the WPC standard. Note that a range in which communication based on the WPC standard is possible between TX and RX is a range similar to the range in which TX can transmit power.

Figure 5:
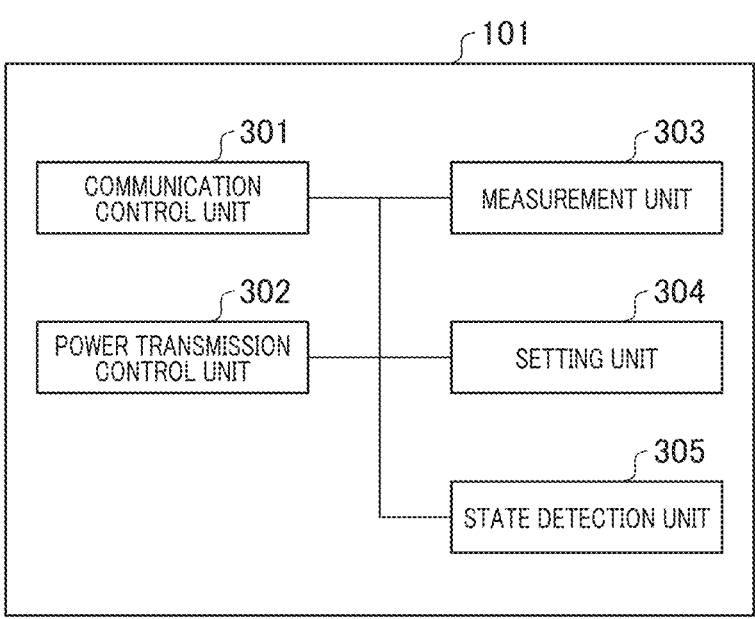
FIG. 5 is a block diagram illustrating a functional configuration example of a control unit of the power transmitting device.

Next, functions of the control unit 101 of TX will be explained with reference to FIG. 5. FIG. 5 is a block diagram illustrating a functional configuration example of the control unit 101 of the power transmitting device 100 (TX). The control unit 101 includes a communication control unit 301, a power transmission control unit 302, a measurement unit 303, a setting unit 304, and a state detection unit 305. The communication control unit 301 performs communication control with RX based on the WPC standard via the first communication unit 104 or performs communication control with RX via the second communication unit 109.

The power transmission control unit 302 controls power transmission to RX by controlling the power transmitting unit 103. The measurement unit 303 measures a waveform decay indicator, which will be described later. Also, the measurement unit 303 measures the power to be transmitted to RX via the power transmitting unit 103 and measures an average transmitted power for each unit time. In addition, the measurement unit 303 measures the Q-factor of the power transmitting antenna 105. The state detection unit 305 measures the amount (for example, a coupling coefficient) representing an electromagnetically coupled state between the power transmitting antenna 105 and the power receiving antenna 205.

The setting unit 304 calculates and sets a threshold value for foreign matter detection on the basis of the waveform decay indicator measured by the measurement unit 303. In addition, the setting unit 304 calculates and sets a threshold value for foreign matter detection or a threshold value for detecting positional deviation between TX and RX on the basis of the coupling coefficient between the power transmitting antenna 105 and the power receiving antenna 205 measured by the measurement unit 303, for example.

The state detection unit 305 detects states of TX and RX. For example, the state detection unit 305 detects a foreign matter that is present between TX and RX and detects positional deviation between the power transmitting antenna 105 and the power receiving antenna 205. More specifically, it is possible to perform state detection processing by the Power Loss method, the Q factor measuring method, or the waveform decay method, or on the basis of the electromagnetically coupled state (for example, the coupling coefficient) between the power transmitting antenna 105 and the power receiving antenna 205. The state detection unit 305 can perform the foreign matter detection and the processing of detecting positional deviation between the power transmitting antenna 105 and the power receiving antenna 205 by other methods. For example, the state detection unit 305 performs the processing of detecting the state using a counterpart device detection function based on the NFC standard in TX including an NFC communication function. In addition, the state detection unit 305 can detect a change in state on TX in addition to the detection of presence/absence of the foreign matter and detection of the electromagnetically coupled state between the power transmitting antenna and the power receiving antenna. For example, TX can detect an increase/decrease in number of power receiving devices 200 in TX.

The setting unit 304 sets a threshold value as a reference to determine presence/absence of a foreign matter when TX performs the state detection. The state detection is state detection based on the Power Loss method, the Q factor measuring method, or the waveform decay method or state detection based on the coupling coefficient or the like between the power transmitting antenna 105 and the power receiving antenna 205. Note that the setting unit 304 can set a threshold value for determination necessary for state detection processing using another method. The state detection unit 305 can perform the foreign matter detection processing and processing of detecting positional deviation between the power transmitting antenna 105 and the power receiving antenna 205 on the basis of the threshold value set by the setting unit 304 and the measurement result obtained by the measurement unit 303. For example, the state detection unit 305 can acquire data such as a waveform decay indicator, transmitted power, a Q-factor, a coupling coefficient between the power transmitting antenna 105 and the power receiving antenna 205, and the like as the measurement results of the measurement unit 303.

The processing executed by the communication control unit 301, the power transmission control unit 302, the measurement unit 303, the setting unit 304, and the state detection unit 305 illustrated in FIG. 5 can be realized using a program executed by the CPU or the like included in the control unit 101. Each piece of processing is executed in parallel in synchronization between programs through event processing or the like in accordance with each of independent programs. However, two or more pieces of the processing may be incorporated in processing based on one program.

Figure 6:
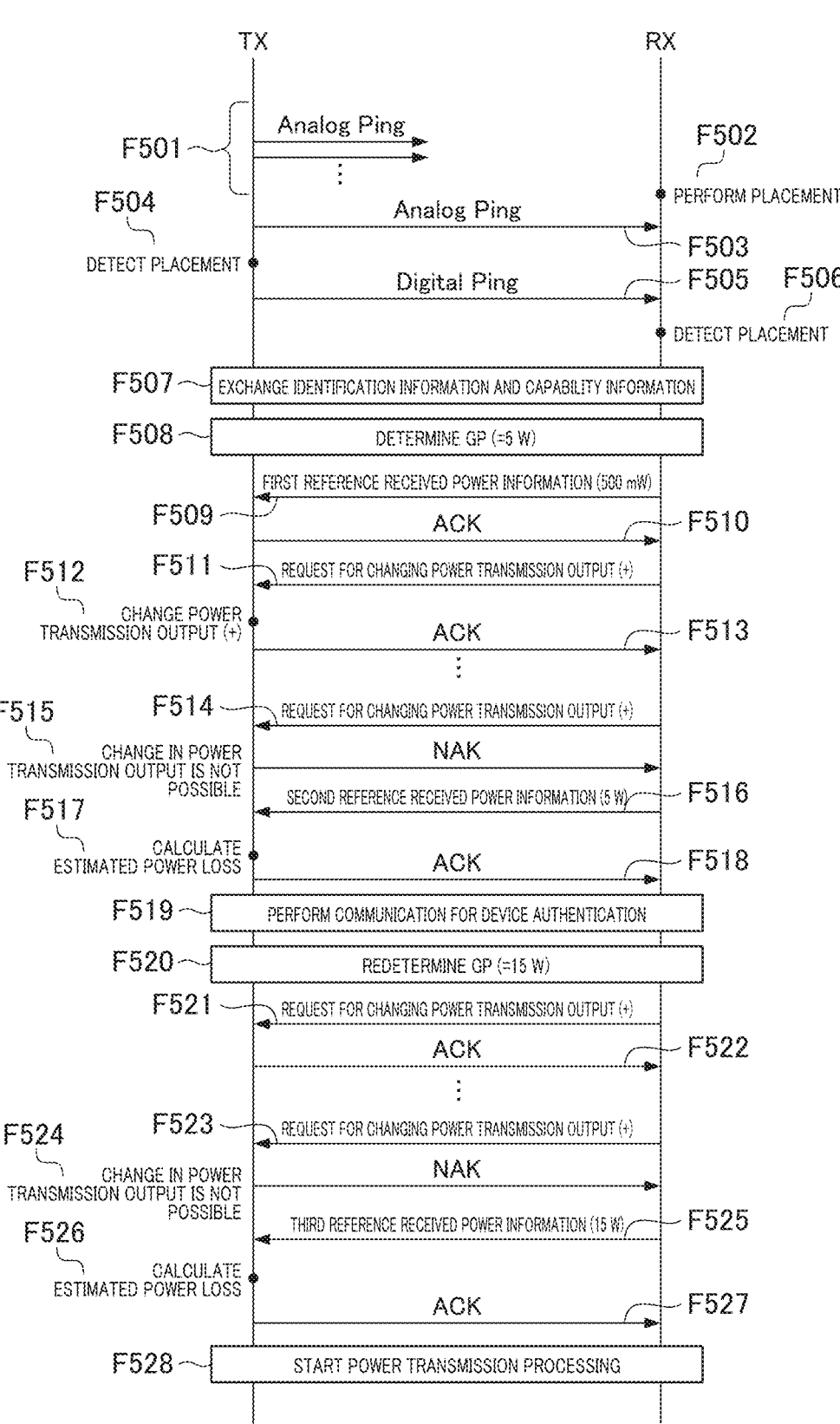
FIG. 6 is a sequence diagram illustrating a processing example for performing wireless power transmission.

A flow of processing for wireless power transmission in accordance with the WPC standard will be explained with reference to FIG. 6. FIG. 6 is a sequence diagram for explaining an operation example of the power transmitting device 100 and the power receiving device 200 in a plurality of phases. FIG. 6 illustrates an operation of the power transmitting device 100 (TX) on the left side and illustrates operations of the power receiving device 200 (RX) on the right side. A charging operation example of a battery of RX when RX is an electronic device such as a communication device or an imaging device will be described. F501 to F528 in the drawing are symbols and numbers to distinguish operation in each stage in a chronological order, and larger numbers indicate temporally later operations.

In F501, TX repeatedly and intermittently transmits Analog Ping based on the WPC standard to detect an object that is present within a range in which power can be transmitted. TX executes processing defined as the Selection Phase and the Ping Phase and waits for placement of RX.

In F502, a user of the electronic device places RX to be closer to TX to charge the battery. For example, an operation of placing RX to be closer to TX is performed by the user placing RX on TX. In F503, Analog Ping is transmitted after placement of RX on TX. In F504, TX detects presence of an object within the range in which power can be transmitted. In this case, TX transmits Digital Ping in accordance with the WPC standard in F505. In F506, once RX receives Digital Ping, it is possible to recognize that TX has detected RX. Also, in a case where there has been a predetermined response to the Digital Ping, TX determines that the detected object is RX and RX has been placed on the charging station 300.

After the placement of RX is detected, TX acquires identification information and capability information from RX through communication in the I&C Phase in F507. For example, there are a Manufacturer Code and a Basic Device ID as identification information of RX. Also, an example of capability information of RX will be described below.

Information by which it is possible to specify a version of the WPC standard that RX is compatible with A Maximum Power Value or Reference Power that is a value of specifying the maximum power that RX can supply to the loads Information indicating whether or not RX has a Negotiation function based on the WPC standard TX may acquire the identification information and the capability information of RX by a method other than the communication in the I&C Phase based on the WPC standard. Also, the identification information of RX may be arbitrary other identification information by which it is possible to identify the individual RXs such as Wireless Power IDs.

Subsequently, TX determines the GP value with RX through communication in the Negotiation Phase defined by the WPC standard in F508. Alternatively, F508 is not limited to the communication in the Negotiation Phase based on the WPC standard, and other processing of determining the GP value is executed. Also, in a case where information indicating that RX is not compatible with the Negotiation Phase is acquired in F507, for example, TX determines the GP value as a predetermined value without performing the communication in the Negotiation Phase. The predetermined value is a value defined in advance in the WPC standard, for example. In the present embodiment, the GP value in F508 is defined as 5 (watts).

Subsequently, TX executes the CAL processing based on the Power Loss method on the basis of the determined GP value in the Calibration Phase defined in the WPC standard. First, RX transmits a signal including information (hereinafter, referred to as first reference received power information) related to received power in the Light Load state to TX in F509. The Light Load state is, for example, a disconnected load state or a load state in which the transmitted power value is equal to or less than a first threshold value. For example, the first reference received power information is assumed to be received power information of RX when transmitted power of TX is 500 milliwatts. Although the first reference received power information is information included in a Received Power Data Packet (mode1) defined by the WPC standard, another message may be used. TX determines whether or not to receive the first reference received power information on the basis of the power transmission state of TX itself. In a case where TX receives the first reference received power information, TX transmits ACK as a positive response to RX. In addition, in a case where TX does not receive the first reference received power information, TX transmits NAK as a negative response to RX.

In F510, RX receives ACK from TX. RX performs processing to transmit a signal including information (hereinafter, referred to as second reference received power information) related to received power in the Connected Load state to TX. The Connected Load state is, for example, a maximum load state or a load state in which the transmitted power value is equal to or greater than a second threshold value. In the present embodiment, the GP value in F508 is 5, and the second reference received power information is defined as received power information of RX when the transmitted power of TX is 5 watts. Alternatively, the second reference received power information is received power information of RX when the transmitted power of TX is close to the aforementioned Reference Power value. Here, although the second reference received power information is information included in a Received Power Data Packet (mode2) defined by the WPC standard), another message may be used. In F511, RX transmits, to TX, a power transmission output change request including a positive designation value as indicated by a positive symbol to increase the power transmitted from TX to 5 watts.

TX receives the power transmission output change request from RX, and in a case where it is possible to handle the transmitted power to increase it, TX performs processing of changing power transmission output and increasing transmitted power in F512. In F513, TX replies to RX with a positive response ACK. In F514, RX transmits a power transmission output change request including a positive designation value exceeding 5 watts to TX. The second reference received power information is received power information when the power transmitted by TX is 5 watts. Therefore, in a case where TX receives a request for increasing power exceeding 5 watts from RX in F514, TX replies with a negative response NAK to the power transmission output change request. In this case, a change in power transmission output is not available, and TX prevents power transmission more than a predefined amount in F515.

RX determines that predefined transmitted power has been reached by receiving NAK from TX. In F516, RX transmits a signal related to the second reference received power information which is information including the received power in the Connected Load state to TX.

In F517, TX can calculate the amount of power loss between TX and RX in the Light Load state and the Connected Load state on the basis of the transmitted power value of TX and the received power values included in the first and second reference received power information. Also, TX can calculate the amount of power loss between TX and RX in all patterns of transmitted power that TX can take, by performing interpolation processing between a plurality of power loss amounts. All the patterns of transmitted power that TX can take means arbitrary power within a range of 500 milliwatts to 5 watts, for example, in the present embodiment.

In F518, TX transmits a positive response ACK in response to the second reference received power information from RX and completes the CAL processing. In a case where TX that has determined that charging processing can be started starts processing of transmitting power to RX, charging of RX is started.

In the present embodiment, TX and RX perform device authentication processing in F519 before the processing of transmitting power is started. In a case where TX and RX determine that the counterpart devices can handle a larger GP value, TX and RX execute processing of determining the GP value again in F520. In F508, a larger value than the GP value is determined again as the GP value. For example, the GP value determined again in F520 is assumed to be 15 (watts). In this case, RX transmits a power transmission output change request including a positive designation value to TX in order to increase the power transmitted by TX to 15 watts in F521. In F522, TX replies with a positive response ACK in response to the power transmission output change request. Then, in F523, RX transmits a power transmission output change request including a positive designation value to TX. In F524, in a case where a request for increasing power exceeding 15 watts is received from RX, TX does not receive the power transmission output change request and replies with a negative response NAK in response to the power transmission output change request.

In this manner, RX and TX continuously execute the processing of increasing the power transmission output using ACK and NAK. Then, TX and RX executes the CAL processing again with respect to GP=15 (watts) determined again. Specifically, in F525, RX transmits a signal of information (hereinafter, referred to as third reference received power information) related to received power of RX in the Connected Load state when the power transmitted by TX is 15 watts. In F526, TX performs CAL processing on the basis of the received power values included in the first, second, and third reference received power information and calculates the amount of power loss between TX and RX in all patterns of transmitted power that TX can take. In F527, TX transmits a positive response ACK in response to the third reference received power information from RX and completes the CAL processing. Therefore, TX that has determined that the charging processing can be started starts processing of transmitting power to RX and moves on to the Power Transfer Phase in F528.

TX transmits power to RX and performs foreign matter detection processing based on the Power Loss method in the Power Transfer Phase. For example, the amount of power loss between TX and RX in the first detection state in the power transmission processing is calculated from a difference between the transmitted power value and the received power value through the CAL processing. The calculated amount of power loss corresponds to a reference amount of power loss in a state where no foreign matter is present. Then, in a case where a difference between the amount of power loss between TX and RX and the reference amount of power loss measured during power transmission after the CAL processing is determined to be equal to or greater than a threshold value, TX determines a second detection state.

As described above, the Power Loss method is a method of performing foreign matter detection on the basis of a result of measuring the amount of power loss during power transmission from the power transmitting device 100 to the power receiving device 200. The method has a disadvantage that accuracy of foreign matter detection is degraded when the power transmitting device 100 transmits large power while the method has an advantage that it is possible to perform the foreign matter detection processing while continuing power transmission and to thereby keep high power transmission efficiency.

Incidentally, erroneous detection of a foreign matter may occur, or erroneous determination of determining that there are no foreign matters regardless of presence of a foreign matter may occur, merely by the foreign matter detection based on the Power Loss method in the Power Transfer Phase. For example, a case where a foreign matter is present in the vicinity of TX and RX is present during power transmission in the Power Transfer Phase in which TX transmits power is assumed. In this case, since heat generated by the foreign matter may increase, an improvement in foreign matter detection accuracy in the Power Transfer Phase is required. Thus, a waveform decay method capable of detecting a foreign matter on the basis of an decay state of a transmitted power waveform for the purpose of improving foreign matter detection accuracy will be described.

According to the waveform decay method, the power transmitting device 100 can detect a foreign matter using the power transmission waveform (a voltage waveform or a current waveform) related to the power transmission to the power receiving device 200. In other words, it is possible to perform the foreign matter detection without using a newly defined foreign matter detection signal or the like.

Figure 7:
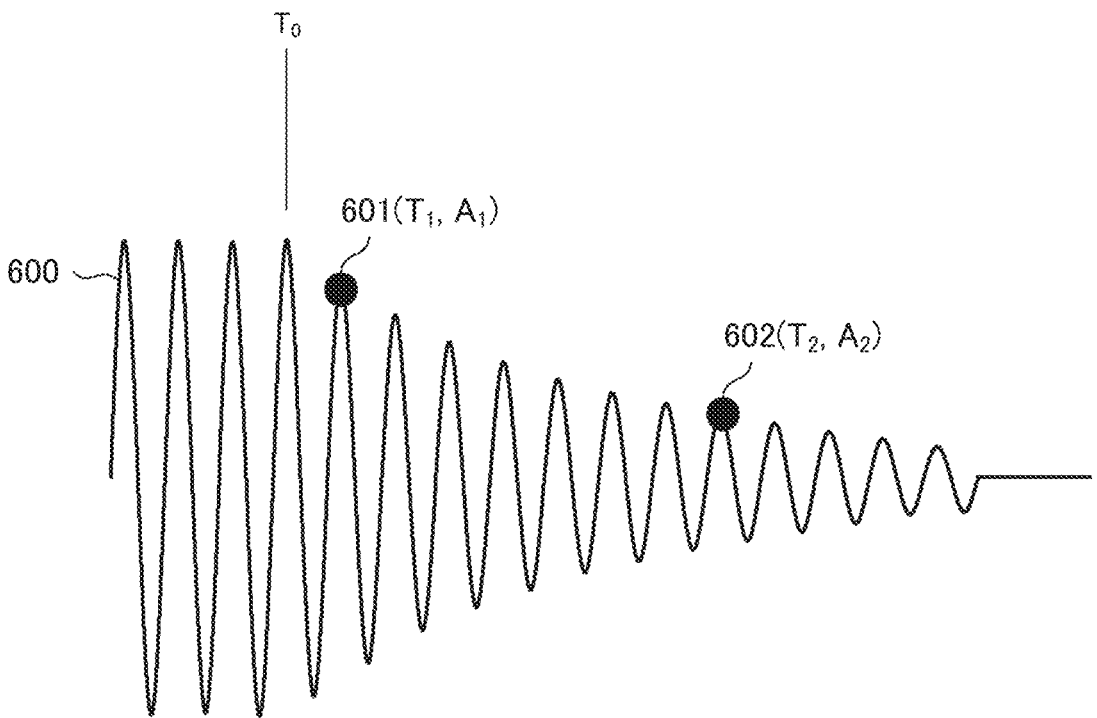
FIG. 7 is an explanatory diagram of state detection based on a waveform decay method.
Figure 7:
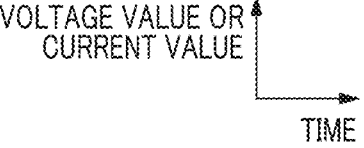

FIG. 7 is a diagram for explaining a foreign matter detection principle based on the waveform decay method. An example of foreign matter detection using a power transmission waveform related to power transmission from the power transmitting device 100 (TX) to the power receiving device 200 (RX) is illustrated. In FIG. 7, the horizontal axis represents a time axis, and the vertical axis represents a voltage value or a current value. A waveform 600 illustrated in FIG. 7 illustrates a change in voltage value of a high-frequency voltage applied to the power transmitting antenna 105 of TX, for example, with elapse of time. TX that is transmitting power to RX via the power transmitting antenna 105 stops power transmission at a clock time TO. At the clock time TO, power supply for power transmission from the power source unit 102 is stopped. A frequency f of the power transmission waveform is a fixed frequency between 85 kHz and 205 kHz that is used in the WPC standard, for example. A point 601 on the waveform 600 is a point on an envelope of the high-frequency voltage and corresponds to a voltage value A1 at a clock time T1. As the point 601, (T1, A1) indicates that the voltage value at the clock time T1 is A1. A point 602 on the waveform 600 is a point on the envelope of the high-frequency voltage and corresponds to a voltage value A2 at a clock time T2. At the point 602, (T2, A2) indicates that the voltage value at the clock time T2 is A2.

A quality coefficient (Q-factor) of the power transmitting antenna 105 can be obtained on the basis of a temporal change in voltage value at and after the clock time T0. For example, TX calculates the Q-factor by Expression 1 on the basis of the clock times, the voltage values, and the frequencies f of the high-frequency voltage at the points 601 and 602 on the envelope of the high-frequency voltage.

$$Q = \Pi f(T2 - T) / \ln(A1 / A2) \qquad \text{(Expression 1)}$$

In Expression 1, ln represents a natural logarithmic function.

The value of Q-factor decreases in a case where a foreign matter is present in the vicinity of TX and RX, and the reason is that an energy loss occurs due to the foreign matter. Therefore, if an inclination of decay of the voltage value is focused, an inclination of a straight line connecting the point 601 to the point 602 is greater in the case where a foreign matter is present than in the case where no foreign matter is present. In a case where an energy loss due to the foreign matter occurs, a decay rate of an amplitude of the waveform 600 increases. For example, it is possible to determine presence/absence of a foreign matter on the basis of a decay state of the voltage value between the point 601 and the point 602 in the waveform decay method. In order to actually determine presence/absence of a foreign matter, it is possible to perform determination through comparison of some numerical values representing the decay state. In a case where determination is performed using the Q-factor, for example, the value of Q-factor being smaller than a reference value means that a waveform decay rate (a degree of decrease in amplitude of the waveform per unit time) increases.

In another example, there is a method of performing determination using an inclination of a straight line connecting the point 601 and the point 602 calculated by (A1−A2)/(T2−T1). In addition, in a case where clock times (T1 and T2) at which the decay state of the voltage value is measured are assumed to be fixed, it is possible to determine presence/absence of a foreign matter using a difference (A1−A2) of the voltage values or a ratio (A1/A2) of the voltage values. Alternatively, in a case where a voltage value A1 immediately after power transmission is stopped is assumed to be constant, it is possible to determine presence/absence of a foreign matter using the voltage value A2 after elapse of a predetermined time. Alternatively, it is possible to determine presence/absence of a foreign matter using an elapse time (T2−T1) until the voltage value A1 becomes the predetermined voltage value A2.

In the waveform decay method, it is possible to determine presence/absence of a foreign matter depending on a decay state of a waveform during a power transmission stop period. Indicators such as a Q-factor representing a decay state will be collectively referred to as "waveform decay indicators" in the present embodiment. Also, although description has been given on the assumption that the vertical axis in FIG. 7 is an axis of the voltage value of the high-frequency voltage applied to the power transmitting antenna 105 of TX, the vertical axis in FIG. 7 may represent a value of a current flowing through the power transmitting antenna 105. Similarly to the case of the voltage value, a decay state of the current value in the power transmission stop period changes depending on presence/absence of a foreign matter. A waveform decay rate is higher in a case where a foreign matter is present than in a case where no foreign matter is present. Therefore, it is possible to detect a foreign matter by applying a method similar to the aforementioned method in regard to a temporal change in value of the current flowing through the power transmitting antenna 105. In other words, it is possible to determine presence/absence of a foreign matter using, as waveform decay indicators, the Q-factor calculated from the current waveform, an inclination of decay of a current value, a difference in current values, a ratio of current values, an absolute value of a current value, a time required for a current value to become a predetermine value, and the like and to perform foreign matter detection.

Also, there is a method based on both the decay state of the voltage value and the decay state of the current value. According to the method, it is possible to determine presence/absence of a foreign matter using an evaluation value calculated from the waveform decay indicators of the voltage value and the waveform decay indicators of the current value. Note that the present disclosure is not limited to an example in which the waveform decay indicators during a period in which TX temporarily stops power transmission are measured. The waveform decay indicators during a period in which TX temporarily lowers the power supplied from the power source unit 102 from a predetermined power level to a power level that is lower than the predetermined power level may be measured.

A specific example of a method of performing foreign matter detection on the basis of a power transmission waveform (a waveform of a voltage applied to the power transmitting antenna or a waveform of a current flowing through the power transmitting antenna) by the waveform decay method will be described with reference to FIG. 7. In a transition response period immediately after TX starts power transmission, the power transmission waveform is not stable. Therefore, RX controls TX not to perform communication based on load modulation or amplitude modulation during the transition response period. Also, TX controls RX not to perform communication based on frequency shift keying.

TX temporarily stops power transmission to RX at a timing (clock time TO) at which foreign matter detection is performed. In a foreign matter detection period during which the power transmission is temporarily stopped, an amplitude of the power transmission waveform is decayed. TX calculates a waveform decay rate of the power transmission waveform at this time. In a case where the calculated waveform decay rate exceeds a predetermined threshold value, TX determines that a foreign matter is present. In a case where TX determines that no foreign matter has been detected after elapse of a predetermined foreign matter detection period, TX restarts the power transmission to RX. After the power transmission is restarted, TX repeatedly executes waiting in the transition response period, determination of a foreign matter detection timing, power transmission stop, and foreign matter detection processing.

If elements such as the power receiving unit 203, the charging unit 206, and the battery 207 are connected to the power receiving antenna 205 and the resonance capacitor 211 of the power receiving device 200 at the time of measurement of the waveform decay indicators, then the waveform decay indicators are affected by loads of these elements. In other words, the values of the waveform decay indicators change depending on states of the power receiving unit 203, the charging unit 206, and the battery 207. As s result, even in a case where the values of the waveform decay indicators are large, for example, it is difficult to distinguish whether that is caused as an influence of a foreign matter or due to a change in states of the power receiving unit 203, the charging unit 206, the battery 207, and the like.

Thus, in a case where the waveform decay indicators are measured and foreign matter detection is performed, the control unit 201 of RX turns off the first switch unit 209. In this manner, it is possible to reduce an influence of the battery 207. Alternatively, the control unit 201 turns on and short-circuits the second switch unit 210 and brings a state in which a current flows through a closed loop circuit formed by the power receiving antenna 205, the resonance capacitor 211, and the second switch unit 210. In this manner, it is possible to reduce influences of the power receiving unit 203, the charging unit 206, and the battery 207.

As described above, it is possible to perform the foreign matter detection with higher accuracy by performing the foreign matter detection in the state where the first switch unit 209 is disconnected, or in the state where the second switch unit 210 is turned on and short-circuited (connected). Alternatively, it is possible to perform foreign matter detection with higher accuracy by performing both the disconnection of the first switch unit 209 and the short-circuiting (connection) of the second switch unit 210. Moreover, similar effects can also be obtained by bringing the Light Load state instead of the state where the first switch unit 209 is disconnected.

In addition, if elements such as the power transmitting unit 103, the first communication unit 104, and the power source unit 102 are connected to the power transmitting antenna 105 and the resonance capacitor 107 of the power transmitting device 100 when the waveform decay indicators are measured, the waveform decay rate is affected by these elements. In other words, the values of the waveform decay indicators change depending on states of the power transmitting unit 103, the first communication unit 104, and the power source unit 102. As a result, even in a case where the values of the waveform decay indicators are large, for example, it is difficult to distinguish whether that is caused as influences of a foreign matter or as influences of the power transmitting unit 103, the first communication unit 104, and the power source unit 102.

Thus, the control unit 101 of TX turns on the switch unit 108 and brings a state in which a current flows through a closed loop circuit formed by the power transmitting antenna 105, the resonance capacitor 107, and the switch unit 108 at the time of measurement of the waveform decay indicator. In this manner, it is possible to reduce influences of the power transmitting unit 103, the first communication unit 104, and the power source unit 102. Alternatively, a switch may be provided between the closed loop circuit formed by the power transmitting antenna 105, the resonance capacitor 107, and the switch unit 108 and the power transmitting unit 103. TX can reduce the aforementioned influences by disconnecting the closed loop circuit from the power transmitting unit through control of the switch when the waveform decay indicators are measured to perform the foreign matter detection.

As described above, it is possible to perform foreign matter detection with higher accuracy by bringing the short-circuited (connected) state in which the switch unit 108 is turned on or the disconnected state in which the closed loop circuit and the power transmitting unit 103 are disconnected by the switch. Alternatively, it is possible to perform foreign matter detection with yet higher accuracy by performing both the short-circuiting of the switch unit 108 and the disconnection of the switch.

Figure 8:
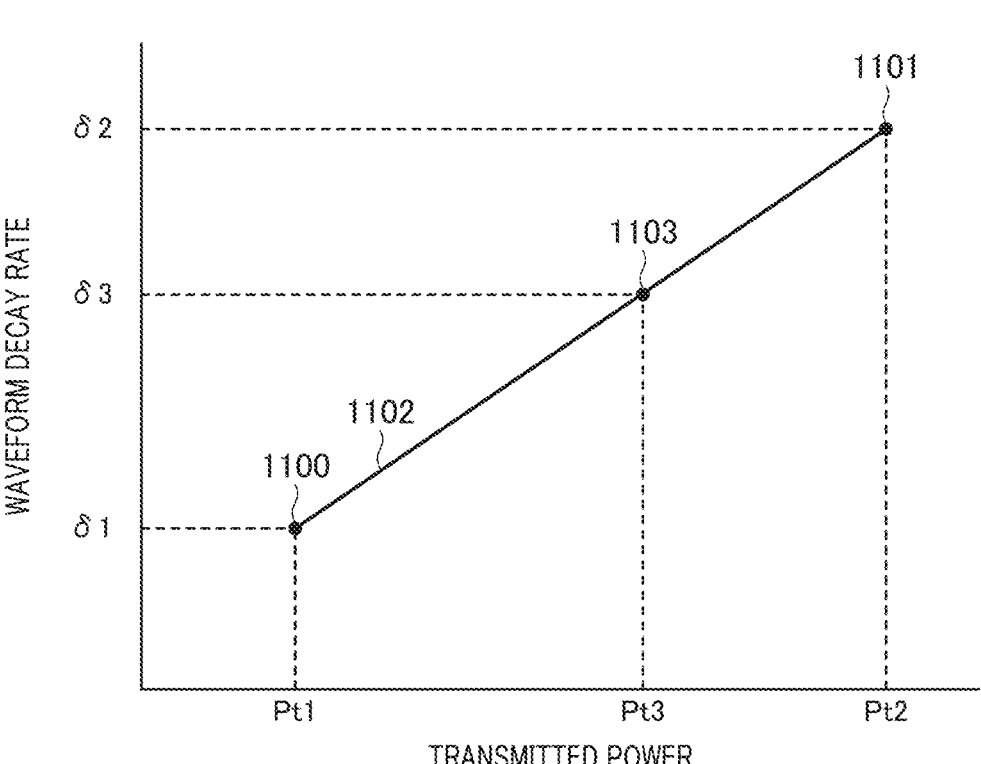
FIG. 8 is an explanatory diagram of a threshold value setting method in the state detection based on the waveform decay method.

Next, a method of setting a threshold value for the waveform decay indicators when state detection or foreign matter detection is performed by the waveform decay method will be described. In FIG. 8, the horizontal axis represents transmitted power of the power transmitting device 100, and the vertical axis represents a waveform decay indicator (waveform decay rate) of a voltage waveform or a current waveform. On a graph line indicated by a line segment 1102 with a straight line shape, a point 1100 corresponds to a transmitted power value Pt1 and a waveform decay indicator 81, a point 1101 corresponds to a transmitted power value Pt2 and a waveform decay indicator 82. On the graph line, a point 1103 corresponds to a transmitted power value Pt3 and a waveform decay indicator 83.

First, RX performs control such that RX is brought into a Light Load state in a case where there has been power transmission from TX. In the Light Load state, a state where power is not supplied to the loads of RX or only power that is less than the threshold value is supplied is achieved. The transmitted power value of TX in this state is defined as Pt1. Also, TX stops power transmission in the Light Load state and measures the waveform decay indicator 81. At this time, TX recognizes the transmitted power value Pt1 and stores, in a memory, a CP 1100 that is a calibration point at which the transmitted power value Pt1 and the waveform decay indicator 81 are to be associated. Next, RX controls the Connected Load state. The Connected Load state is a state where maximum power is supplied to the loads of RX or power that is equal to or greater than a predetermined threshold value is supplied thereto in a case where there has been power transmission from TX. The transmitted power value of TX in this state is defined as Pt2. Then, TX stops power transmission in the Connected Load state and measures the waveform decay indicator 82. At this time, TX stores, in the memory, a CP 1101 that associates the transmitted power value Pt2 and the waveform decay indicator 82. Subsequently, TX performs linear interpolation between CP 1100 and CP 1101 and generates a line segment 1102. The line segment 1102 indicates a relationship between transmitted power and the waveform decay indicator of the power transmission waveform in the first detection state in which no foreign matter is present in the surroundings of TX and RX. Therefore, TX can estimate the waveform decay indicator of the power transmission waveform for each transmitted power value in the first detection state on the basis of the line segment 1102. In a case of the transmitted power value Pt3, for example, the waveform decay indicator is estimated as 83 from the point 1103 on the line segment 1102 corresponding to Pt3. TX can calculate a threshold value used to determine presence/absence of a foreign matter for each transmitted power value on the basis of the estimation result. For example, it is possible to set a waveform decay indicator that is greater than the estimation result of the waveform decay indicator in the first detection state at a certain transmitted power value by a predetermined value (a value corresponding to a measurement error) as a threshold value to determine presence/absence of a foreign matter.

The CAL processing that the power transmitting device 100 and the power receiving device 200 perform in order for the power transmitting device 100 to acquire a combination of a transmitted power value and a waveform decay indicator will be referred to as "CAL processing based on the waveform decay method" below. Note that RX may perform each of control in the Light Load state and control in the Connected Load state after providing a notification to TX. Also, any of the two kinds of control may be performed earlier.

The method of calculating the threshold value used to determine presence/absence of a foreign matter for each load (or each transmitted power value) described in the present embodiment may be performed in the Calibration Phase. As described above, TX acquires data necessary to perform foreign matter detection based on the Power Loss method in the Calibration Phase. At that time, TX acquires data related to a power loss of each of the case where the load state of RX is the Light Load state and the case where the load state of RX is the Connected Load state. Thus, measurement of CP 1100 and CP 1101 in FIG. 8 may be performed together with the measurement of the power loss when RX is brought into the Light Load state and the Connected Load state in the Calibration Phase. For example, when TX receives a signal including first reference received power information from RX, TX performs measurement of CP 1100 in addition to the predetermined processing to be performed in the Calibration Phase. Although the first reference received power information is information regarding a Received Power Data Packet (mode1) defined by the WPC standard, another message may be used. Also, when TX receives a signal including second reference received power information from RX, TX performs measurement of CP 1101 in addition to the predetermined processing to be performed in the Calibration Phase. Although the second reference received power information is information regarding a Received Power Data Packet (mode2) defined by the WPC standard, another message may be used. Since there is no need to separately provide periods during which measurement of CP 1100 and CP 1101 is performed, it is possible to execute measurement of CP 1100 and CP 1101 in a shorter period of time.

In addition, in a case where the Q-factor calculated from Expression 1 described above is used, for example, as the waveform decay indicator, there is a method of setting a threshold value on the basis of a Reference Quality Factor Value. The Reference Quality Factor Value is included in and transmitted with an FOD Status Data Packet from RX to TX. The Reference Quality Factor Value is a Q-factor that can be measured by the terminal of the power transmitting antenna of the test TX in a case where RX is placed on the test TX and no foreign matter is present nearby. The Reference Quality Factor Value is physically synonymous with the Q-factor calculated from Expression 1 above, and it is thus possible to set the threshold value using the Reference Quality Factor Value. Note that a value of a waveform decay indicator in consideration of a predetermined value (a value corresponding to a measurement error) in addition to the Reference Quality Factor Value may be set as the threshold value to determine presence/absence of a foreign matter.

In addition, TX may perform the waveform decay method in a state where there is no foreign matter (in a state where there is no state abnormality), and a result of measuring the waveform decay indicator may be set as the threshold value. Hereinafter, a timing at which the waveform decay rate in the state where there is no foreign matter is measured in advance will be explained. In a case where it is determined that there is no foreign matter as a result of performing the foreign matter detection based on the Q factor measuring method in the Negotiation Phase of the WPC standard, the processing proceeds to the Calibration Phase and the Power Transfer Phase. In other words, a situation in which the processing proceeds to the Negotiation Phase and the later phases means that it has been determined that there are no foreign matters as a result of the foreign matter detection based on the Q factor measuring method. There is a high probability that the waveform decay indicator in a state where there is no foreign matter can be measured in any of the Negotiation Phase, the Calibration Phase, and the Power Transfer Phase. Therefore, the timing at which the waveform decay indicator in the state where there is no foreign matters are measured may be any of the Negotiation Phase, the Calibration Phase, and the Power Transfer Phase.

For example, a case where measurement of the waveform decay indicator is performed in the Power Transfer Phase is assumed. The timing at which the waveform decay indicator in a state where there is no foreign matter is measured is set in the first stage of the Power Transfer Phase. The reason is because the probability at which a foreign matter enters the vicinity of TX and RX increases with elapse of time from the point at which it has been determined that there is no foreign matter by the Q factor measuring method. The timing is designated by RX or TX, and TX measures the waveform decay indicator at that time and sets the value of the waveform decay indicator as the threshold value. Note that a value in consideration of a predetermined value (a value corresponding to a measurement error) in addition to the waveform decay indicator may be set as the threshold value to determine presence/absence of a foreign matter.

The number of threshold values for determination set by the above method is not limited to one. It is possible to set a plurality of threshold values in a stepwise manner. For example, a first threshold value is set as a threshold value to determine that "there is state abnormality", a second threshold value is set as a threshold value to determine that "there is a high probability of state abnormality", a third threshold value is set as a threshold value to determine that "there is a low probability of state abnormality", and a fourth threshold value is set as a threshold value to determine that "there is no state abnormality".

Next, a first measurement method will be described as a method of measuring a coupled state between the power transmitting antenna and the power receiving antenna. In wireless power transmission, power transmission is performed by electromagnetically coupling the power transmitting antenna 105 and the power receiving antenna 205. A voltage is induced in the power receiving antenna 205 by causing an AC current to flow through the power transmitting antenna 105 and changing a magnetic flux penetrating through the power receiving antenna 205. A coupling coefficient (described as k) which is an indicator representing the coupled state between the power transmitting antenna and the power receiving antenna satisfies "k=1" when the entire magnetic flux (100%) generated in the power transmitting antenna penetrates through the power receiving antenna. Also, when 70% of the magnetic flux generated in the power transmitting antenna penetrates through the power receiving antenna, "k=0.7" is satisfied. In this case, the remaining (30%) magnetic flux generated in the power transmitting antenna is a leaking magnetic flux (leakage magnetic flux). This is a magnetic flux that does not penetrate through the power receiving antenna out of the magnetic flux generated in the power transmitting antenna. Therefore, when the coupled state between the power transmitting antenna and the power receiving antenna is satisfactory, and the k value is large, transmission efficiency of power transmitted from TX to RX is high. On the contrary, when the coupled state is satisfactory, and the k value is small, transmission efficiency of power transmitted from TX to RX is low.

Reasons of a decrease in coupling coefficient value include entrance of foreign matters (metal pieces and the like) between the power transmitting antenna and the power receiving antenna and positional deviation between the power transmitting antenna and the power receiving antenna. If foreign matters enter the part between the power transmitting antenna and the power receiving antenna, heat may be generated in the foreign matters. In addition, if positional deviation between the power transmitting antenna and the power receiving antenna occurs, the amount of leaking magnetic flux (leakage magnetic flux) increases, and large noise may occur in the surroundings. In a case where the k value is small, appropriate control is needed to realize safer wireless power transmission with high quality. In the present embodiment, processing of detecting the coupled state (including the coupling coefficient) between the power transmitting antenna and the power receiving antenna is executed in order to improve accuracy of detection of foreign matters and accuracy of detection of the positional deviation.

Figure 9A:
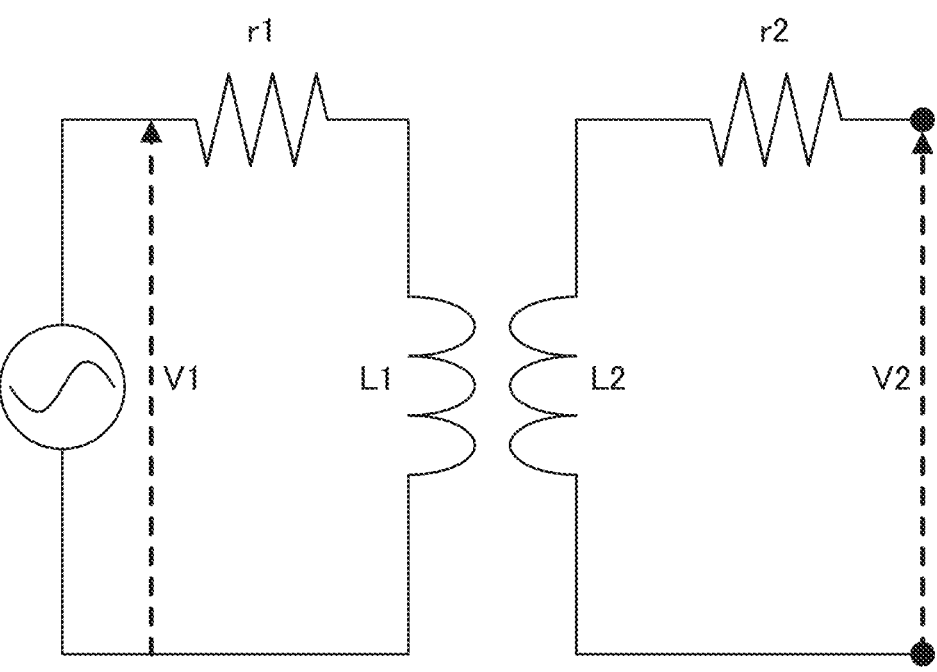
FIGS. 9A and 9B are explanatory diagrams of a method of measuring a coupled state between a power transmitting antenna and a power receiving antenna.

A method of measuring a coupled state between the power transmitting antenna and the power receiving antenna will be described with reference to FIGS. 9A and 9B. FIG. 9A is an equivalent circuit diagram for explaining the first measurement method. Definitions of various amounts related to the primary side (TX) power transmitting antenna (power transmitting coil) are described below.

r1: a winding resistance of the power transmitting coil

L1: a self-inductance of the power transmitting coil

V1: a power transmission voltage (input voltage) applied to the power transmitting coil and measured by TX In addition, definitions of various amounts related to the secondary side (RX) power receiving antenna (power receiving coil) are described below.

r2: a winding resistance of the power receiving coil

L2: a self-inductance of the power receiving coil

V2: a power reception voltage (output voltage) applied to the power receiving coil and measured by RX The coupling coefficient k between the power transmitting coil and the power receiving coil can be calculated by Expression 2 below.

$$k = (V2/V1)*(L1/L2)^{1/2} \qquad \text{(Expression 2)}$$

In a case where TX calculates the coupling coefficient k, RX notifies TX of the measured power reception voltage V2 and the value of the self-inductance L2 of the power receiving coil that RX owns in advance. TX calculates the k value using the measured power transmission voltage V1, the value of the self-inductance L1 of the power transmitting coil held in advance and the power reception voltage V2 and the value of the self-inductance L2 received from RX. Alternatively, RX notifies TX of a coefficient calculated using both L1 and L2 or either L1 or L2 and V2, and TX can calculate the k value using the constant and V2 received from RX and the power transmission voltage V1 measured by TX.

On the other hand, in a case where RX calculates the coupling coefficient k, TX notifies RX of the measured power transmission voltage V1 and the value of the self-inductance L1 of the power transmitting coil held in advance. RX calculates the k value using the measured power reception voltage V2, the value of the self-inductance L2 of the power receiving coil held in advance and the power transmission voltage V1 and the value of the self-inductance L1 received from TX. Alternatively, TX notifies RX of a constant calculated both L1 and L2 or either L1 or L2 and V1, and RX can calculate the k value using the constant and V1 received from TX and the power reception voltage V2 measured by RX.

As for the power transmission voltage V1, TX actually measures a voltage applied to the power transmitting coil, or TX calculates a setting value of transmitted power. Alternatively, the power transmission voltage V1 may be used as a setting value of the power transmission voltage at the time of power transmission. In addition, a power transmission voltage (described as V3) applied to a circuit (for example, an inverter) included in the power transmitting unit 103 of TX and the power transmission voltage V1 applied to the power transmitting coil from voltages applied to both ends of the resonance capacitor 107 can be obtained. In this case, the power transmission voltage V3 may also be calculated by TX from the setting value of the transmitted power. Alternatively, TX may actually measure the power transmission voltage V3 and the voltages applied to both ends of the resonance capacitor 107 and obtain the power transmission voltage V1 using the voltages.

Moreover, when TX or RX performs the first measurement, RX may turn off the third switch unit 213 and perform control such that the terminal of the power receiving antenna 205 is brought into an open state. It is thus possible to bring both ends of the power receiving coil into the open state as illustrated in FIG. 9A. Since the first measurement is not affected by the resonance capacitor 211, the power receiving unit 203, the charging unit 206, and the battery 207, it is possible to measure the coupling coefficient k with higher accuracy. In addition, a power reception voltage (described as V4) applied to a circuit (for example, a rectifier) included in the power receiving unit 203 of RX and the power reception voltage V2 applied to the power receiving coil from the voltages applied to both ends of the resonance capacitor 211 can be obtained. In this case, RX may actually measure the power reception voltage V4 and the voltages applied to both ends of the resonance capacitor 211 and obtain the power reception voltage V2 using the voltages.

Alternatively, when TX or RX performs the first measurement, control may be performed such that RX is brought into the Light Load state or the Connected Load state. It is possible to measure the coupling coefficient k with higher accuracy by keeping the load state of RX constant.

As indicators representing the electromagnetically coupled state between the power transmitting antenna and the power receiving antenna, there are a plurality of amounts other than the coupling coefficient, and these will be collectively referred to as "coupled state indicators" in the present embodiment. All the coupled state indicators have values corresponding to the electromagnetically coupled state between the power transmitting antenna and the power receiving antenna. The content of the present embodiment can be similarly applied even in the case where coupled state indicators other than the coupling coefficient are used.

For example, there are the power transmission voltage V3 applied to a circuit (for example, the inverter) included in the power transmitting unit 103 of TX and the power reception voltage (described as V4) applied to a circuit (for example, the rectifier) included in the power receiving unit 203 of RX as the coupled state indicators. It is possible to perform the processing of calculating the coupled state between the power transmitting antenna and the power receiving antenna using these voltages.

Alternatively, it is possible to calculate the coupled state between the power transmitting antenna and the power receiving antenna using an output voltage (described as V5) of a circuit (for example, the rectifier) included in the power receiving unit 203 of RX. The output voltage V5 is a voltage to be applied to the loads (the charging unit, the battery). TX can notify RX of the power transmission voltage V3, and RX can calculate the coupled state indicators. At this time, TX can notify RX of a constant calculated using an electric property (for example, L1) of the power transmitting antenna, and RX can calculate the coupled state indicators using the constant.

Alternatively, RX notifies TX of the power reception voltage V4 or the output voltage V5, and TX calculates the values of the coupled state indicators. At this time, RX notifies TX of a constant calculated using an electric property (for example L2) of the power receiving antenna, and TX can calculate the coupled state indicators using the constant.

TX and RX transmit and receive information regarding the voltage values V1 to V5, the values of the self-inductances L1 and L2, or the constants representing the electric properties of the power transmitting antenna and the power receiving antenna. Hereinafter, timings of measuring the voltage values and timings of transmission and reception of each piece of information will be described. Measurement of each voltage value is executed in the Ping Phase, for example. In the Ping Phase, TX transmits Digital Ping to RX. Therefore, it is possible to use any of the voltage values V1, V2, V3, V4, and V5 occurring at the time of the transmission of the Digital Ping. In the Ping Phase, TX and RX measure any of the values V1 to V5 and store and hold it in the memory 106 or the memory 208.

TX receives a predetermined packet including the information regarding any of the voltage values V2, V4, and V5 provided through the notification from RX and stores the information in the memory 106. The information included in the predetermined packet may include not only the power reception voltage of RX but also information such as received power, the value of the self-inductance L2, the constant calculated using the electric property of the power receiving antenna, and the like. It is possible to notify TX of information regarding RX using a Signal Strength Data Packet as the predetermined packet. Alternatively, the predetermined packet may be an Identification Data Packet, or an Extended Identification Data Packet, or a Configuration Data Packet in the I&C Phase. Alternatively, the predetermined packet may be a packet in the Calibration Phase or the Power Transfer Phase. In other words, the predetermined packet may be a Received Power Data Packet (mode1), a Received Power Data Packet (mode2), or a Received Power Data Packet (mode0). Note that the present disclosure is not limited to the example in which TX uses the voltage value occurring at the time of transmission of the Digital Ping. TX may use any of voltage values V1 to V5 occurring at the time of transmission of Analog Ping in the Selection Phase.

When RX performs the first measurement, RX may turn off the third switch unit 213 between the resonance capacitor 211 and the power receiving unit 203 and perform control such that the terminal of the circuit configured of the power receiving antenna 205 and the resonance capacitor 211 is brought into the opened state. In this manner, the first measurement is not affected by the power receiving unit 203, the charging unit 206, and the battery 207, and it is thus possible to measure the coupled state indicators with higher accuracy.

Next, a second measurement method will be described as another example of the method of measuring the coupled state between the power transmitting antenna and the power receiving antenna. FIG. 9B is an equivalent circuit diagram for explaining the second measurement method. The reference signs r1, r2, L1, and L2 are the same as those in FIG. 9A. Definitions of various amounts related to the primary side (TX) power transmitting antenna (power transmitting coil) are described below.

V6: an input voltage of the power transmitting antenna when the power receiving antenna side is in a short state V7: an input voltage of the power transmitting antenna when the power receiving antenna side is in an opened state I1: a current flowing through the power transmitting antenna when the power receiving antenna side is in the short state I2: a current flowing through the power transmitting antenna when the power receiving antenna side is in the opened state The coupling coefficient k can be calculated by Expression 3 below.

$$k = (1 - Lsc / Lopen)^{1/2} \qquad \text{(Expression 3)}$$

In Expression 3, Lsc represents an inductance of the power transmitting coil in a case where both ends of the power receiving coil are short-circuited. For example, the control unit 201 brings the third switch unit 213 and the second switch unit 210 into an ON state (short-circuited state). It is possible to acquire the Lsc value by measuring the inductance value of the power transmitting coil in this state. The inductance value of the power transmitting coil can be obtained from the input voltage V6 of the power transmitting coil and the current I1.

Lopen in Expression 3 represents an inductance of the power transmitting coil in a case where both ends of the power receiving coil is opened. For example, the control unit 201 brings the third switch unit 213 into an OFF state (opened state). It is possible to acquire the Lopen value by measuring the inductance value of the power transmitting coil in this state. The inductance value of the power transmitting coil can be obtained from the input voltage V7 of the power transmitting antenna and the current I2. According to the second measurement method, it is possible to obtain the coupled state indicator (coupling coefficient) from the input voltage of the power transmitting antenna and the current in each of the case where both ends of the power receiving antenna are short-circuited and the case where both ends are opened.

In addition, TX can calculate the coupled state indicator on the basis of the power transmission voltage applied to a circuit (for example, the inverter) included in the power transmitting unit 103 and the current. In this case, the input voltages V6 and V7 represent power transmission voltages applied to the circuit (for example, the inverter) included in the power transmitting unit 103. Also, the input voltages V6 and V7 may be voltages applied to both terminals of a serial resonance circuit including the power transmitting antenna and the resonance capacitor. Alternatively, the power transmission voltage applied to the circuit (for example, the inverter) included in the power transmitting unit 103 and the voltages applied to both ends of the resonance capacitor 107 may be measured, and the voltage applied to the power transmitting antenna may be calculated from the result. In other words, it is possible to obtain the coupled state indicator from the results of measuring the power transmission voltage applied to the circuit (for example, the inverter) included in the power transmitting unit 103 and the voltages applied to both ends of the resonance capacitor 107. TX may calculate the power transmission voltage applied to the circuit (for example, the inverter) included in the power transmitting unit 103 in this case from a setting value of the transmitted power.

Figure 9B:
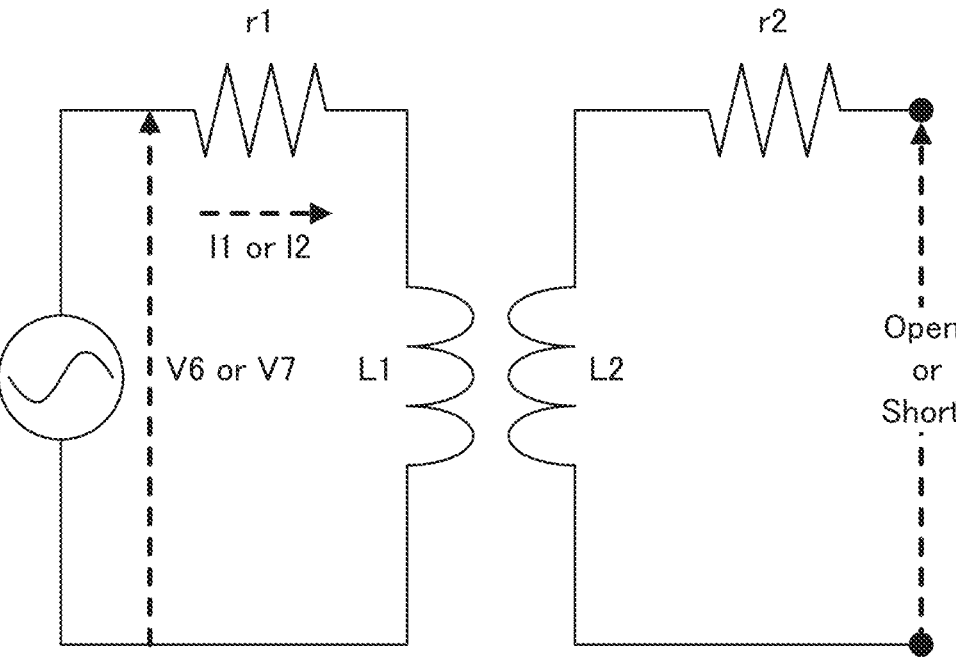

Moreover, the current I1 or I2 in FIG. 9B is not limited to the current flowing through the power transmitting antenna and may be a current flowing through the circuit (for example, the inverter) included in the power transmitting unit 103, for example. The example in which the opened state and the short state of the power receiving antenna are realized by the control unit 201 through control of the second switch unit 210 and the third switch unit 213 has been described. These states may be realized by the power receiving unit 203. Also, the Light Load state may be used instead of the short state.

In the second measurement method, TX can calculate the coupled state indicator by measuring the input voltages V6 and V7 and the currents I1 and I2. Therefore, since information such as the voltage values and the inductance value of the power receiving antenna measured by RX is not needed, it is not necessary for RX to notify TX of the information. However, it is necessary for both terminals of the circuit including the power receiving antenna to be short (short-circuited) in RX when TX measures the input voltage V6 and the current I1. In addition, it is necessary for both terminals of the circuit including the power receiving antenna to be opened in RX when TX measures the input voltage V7 and the current I2. In other words, it is necessary to control both terminals of the circuit including the power receiving antenna into the short (short-circuited) or opened state in RX in accordance with the timing at which TX measures the input voltage and the current. The measurement timing is determined by TX and is provided through a notification to RX, or is determined by RX and is provided through a notification to TX. The notification is performed through communication based on the WPC standard performed between the first communication unit 104 of TX and the first communication unit 204 of RX or communication based on a standard other than the WPC standard performed between the second communication unit 109 of TX and the second communication unit 212 of RX.

Measurement of the input voltages V6 and V7 and the currents I1 and I2 is executed in the Ping Phase, for example. In the Ping Phase, TX transmits Digital Ping to RX. Therefore, it is possible to use the values of V6 and V7 and the currents I1 and I2 occurring at the time of the transmission of Digital Ping. In the Ping Phase, TX acquires the values of V6, V7, I1, and I2, holds them in the memory 106, and calculates the coupled state indicator. Note that the present disclosure is not limited to the example in which TX uses the voltage values and the current values occurring at the time of transmission of the Digital Ping. For example, TX may use the values of V6, V7, I1, and I2 occurring at the time of transmission of the Analog Ping in the Selection Phase.

The present disclosure relates to a method of measuring the coupled state between the power transmitting antenna and the power receiving antenna, and both the first measurement method and the second measurement method can be applied. Hereinafter, a method of setting a state determination threshold value for the coupled state indicator acquired by the first or second measurement method will be described. The state determination is determination related to detection of foreign matters between the power transmitting antenna and the power receiving antenna, determination related to detection of positional deviation between the power transmitting antenna and the power receiving antenna, or the like. It is possible to perform the first or second measurement method and to determine presence/absence of state abnormality using the state determination threshold value. Hereinafter, first to fourth threshold value setting methods will be described.

The first threshold value setting method is a method of setting, as a threshold value, a value of a coupled state indicator in a state where there is no state abnormality for the coupled state indicator used to detect the state between the power transmitting antenna and the power receiving antenna. Through the state detection, determination results such as "there is state abnormality", "there is a high probability of state abnormality", "there is a low probability of state abnormality", and "there is no state abnormality", for example, are obtained. A case where RX is placed on the test TX and there is no state abnormality between the power transmitting antenna and the power receiving antenna is assumed. In this case, it is possible to define, as the threshold value, a value of the coupled state indicator between the test TX including the power transmitting antenna and RX including the power receiving antenna. The value (threshold value) of the coupled state indicator measured in advance is held by RX in the memory, and RX notifies TX of the threshold value. TX performs the determination processing related to the state detection using the threshold value. RX may include the threshold value in an FOD Status Data Packet defined by the WPC standard and transmit it to TX.

The second threshold value setting method is a method in which TX and RX set, as a threshold value, the coupled state indicator measured by the first or second measurement method in the "state where there is no state abnormality between the power transmitting antenna and the power receiving antenna". As a method of confirming the "state in which there is no state abnormality between the power transmitting antenna and the power receiving antenna", it is possible to use a mechanism that detects a state between TX and RX such as detection of foreign matters based on the Power Loss method, the Q factor measuring method, or the like. In a case where it is determined that there is no state abnormality as a result, it is possible to confirm that the state is the "state where there is no state abnormality between the power transmitting antenna and the power receiving antenna" at a high probability. In other words, the confirmation is executed by a method other than the first or second measurement method and a mechanism. In a case where it is determined that "there is no state abnormality" (or "there are no foreign matters") as a result, the coupled state indicator is measured using the first or second measurement method, and an appropriate threshold value is set on the basis of the measurement result.

For example, processing of detecting foreign matters using the Q factor measuring method is executed in the Negotiation Phase or the Renegotiation Phase in the WPC standard. In a case where it is determined that "there is no state abnormality" (or "there are no foreign matters") as a result of the processing of detecting foreign matters, the coupled state indicator is measured using the first or second measurement method in or after the Negotiation Phase or the Renegotiation Phase. It is possible to set a more appropriate threshold value on the basis of the measurement result. In addition, the processing of detecting foreign matters by the Power Loss method is executed in the Power Transfer Phase. After the execution of the processing of detecting foreign matters, the coupled state indicator is measured using the first or second measurement method, and it is possible to set a more appropriate threshold value on the basis of the measurement result. Alternatively, it is possible to execute the processing of detecting foreign matters using the Q-factor or the like in the Selection Phase or the Ping Phase. In this case, the coupled state indicator is measured using the first or second measurement method in or after the phase in which the processing of detecting foreign matters is executed, and it is possible to set an appropriate threshold value on the basis of the measurement results.

Figure 10:
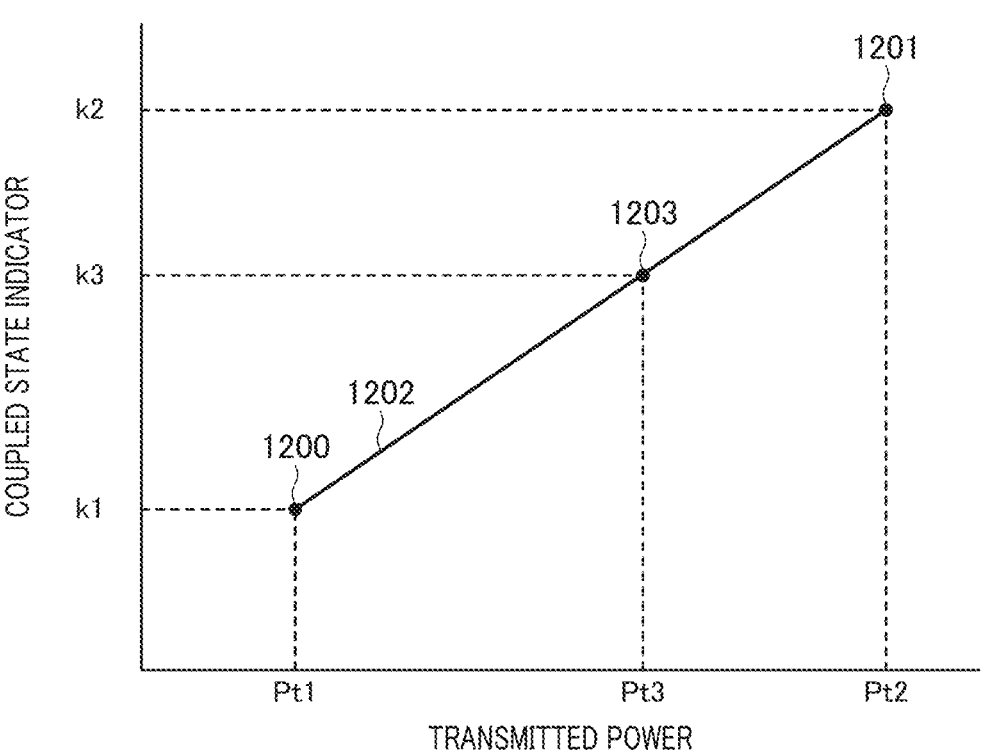
FIG. 10 is an explanatory diagram of a threshold setting method in state detection based on the method of measuring the coupled state.

The third threshold value setting method will be described with reference to FIG. 10. FIG. 10 is a diagram for explaining a threshold value setting method in state detection using a coupled state indicator. In FIG. 10, the horizontal axis represents transmitted power, and the vertical axis represents the coupled state indicator. On a graph line indicated by a linear line segment 1202, a point 1200 corresponds to a transmitted power value Pt1 and a coupled state indicator value k1, and a point 1201 corresponds to a transmitted power value Pt2 and a coupled state indicator value k2. On the graph line, a point 1203 corresponds to a transmitted power value Pt3 and a coupled state indicator value k3. Hereinafter, an exemplary case where the power reception voltage V4 or the output voltage V5 applied to the circuit (for example, the rectifier) included in the power receiving unit 203 of RX is used to calculate the coupled state indicator value by the first measurement method will be described.

As illustrated in FIG. 3, the charging unit 206 and the battery 207 are connected as loads to the power receiving unit 203 of RX, and the calculated coupled state indicator value changes depending on states of the load. In order to determine presence/absence of state abnormality depending on the states of the loads, it is necessary to set a threshold value for the coupled state indicator. First, in a case where TX transmits power, RX performs control such that the loads are brought into the Light Load state. The Light Load state is a state in which no power is supplied to the loads of RX or a state in which only power that is equal to or less than a threshold value is supplied thereto. A transmitted power value in this state is defined as Pt1. TX and RX measure the input voltage on the TX side and the power reception voltage on the RX side in this state. TX and RX exchange information regarding the input voltage and the power reception voltage, and TX or RX calculates a coupled state indicator value k1. At this time, TX recognizes the transmitted power value Pt1 and stores CP 1200 that associates Pt1 with k1 in the memory. Next, RX performs control such that the loads of RX are brought into the Connected Load state in a case where TX transmits power. A state in which the maximum power is supplied to the loads of RX or a state in which power that is equal to or greater than a threshold value is supplied thereto is achieved. The transmitted power value of TX in this state is defined as Pt2. TX and RX measure the input voltage on the TX side and the power reception voltage on the RX side in this state. TX and RX exchange information regarding the input voltage and the power reception voltage, and TX or RX calculates the coupled state indicator value k2. TX stores CP 1201 that associates Pt2 with k2 in the memory. Subsequently, TX performs linear interpolation between CP 1200 and CP 1201 and generates the line segment 1202. The line segment 1202 indicates a relationship between transmitted power and the coupled state indicator in the state where there is no state abnormality in the surroundings of TX and RX. TX can estimate the coupled state indicator value for each transmitted power value in the state where there is no state abnormality in the surroundings of TX and RX using the line segment 1202. For example, a case where the transmitted power value is Pt3 is assumed. In this case, it is possible to estimate that the coupled state indicator value is k3 from the point 1203 on the line segment 1202 corresponding to the transmitted power value Pt3. TX can calculate the threshold value to be used to determine presence/absence of state abnormality for each transmitted power value on the basis of the estimation result. For example, it is possible to set, as a determination threshold value, a coupled state indicator value taking a predetermined value (a value corresponding to a measurement error) into consideration in addition to the result of estimating the coupled state indicator value for a certain transmitted power value in the case where there is no state abnormality.

In this manner, the CAL processing performed by the power transmitting device 100 and the power receiving device 200 in order for the power transmitting device 100 to acquire the combination of the transmitted power value and the coupled state indicator value is referred to as "CAL processing based on the method of measuring a coupled state". Note that RX may perform control to bring the loads into the Light Load state and control to bring the loads into the Connected Load state after providing a notification regarding the execution of the control to TX. Also, any of these two kinds of control may be performed first.

In the present embodiment, the operations for calculating the determination threshold value for state detection for each load (or each transmitted power value) are performed in the Calibration Phase, for example. In the Calibration Phase, TX acquires data necessary to perform foreign matter detection by the Power Loss method. At that time, TX acquires data of the power loss amount in each of the case where the load state of RX is the Light Load state and the case where the load state of RX is the Connected Load state. Thus, the measurement of CP 1200 and CP 1201 in FIG. 10 can be performed together with the measurement of a power loss in the case where RX is brought into the Light Load state and in the case where RX is brought into the Connected Load state in the Calibration Phase. In other words, TX measures CP 1200 in addition to predetermined processing to be performed in the Calibration Phase when TX receives first reference received power information from RX. Although the first reference received power information is information provided by a Received Power Data Packet (mode1) defined by the WPC standard, another message may be used. Also, TX measures CP 1201 in addition to predetermined processing to be performed in the Calibration Phase when TX receives second reference received power information. Although the second reference received power information is information provided by the Received Power Data Packet (mode2), another message may be used. In this manner, since there is no need to separately provide a period to measure CP 1200 and CP 1201, it is possible to measure CP 1200 and CP 1201 in a shorter period of time.

The fourth threshold value setting method is a method in which TX or RX sets a threshold value in advance for a coupled state indicator having a value within a predetermined range. If the coupled state indicator is defined as the coupling coefficient k, for example, the range of the k value satisfies "$0 \leq k \leq 1$". For example, TX or RX determines that "there is state abnormality" in a case where "$0 \leq k < 0.2$" and determines that "there is a high probability of state abnormality" in a case where "$0.2 \leq k < 0.5$". TX or RX determines that "there is a low probability of state abnormality" in a case where "$0.5 \leq k < 0.8$" and determines that "there is no state abnormality" in a case where "$0.8 < k \leq 1$". Data regarding conditions for the k value is held in the memory in advance, and the determination processing is executed on the basis of the conditions.

In addition, it is possible to set, as the determination threshold value, a value taking a predetermined value (a value corresponding to a measurement error) into consideration in addition to the coupled state indicator value calculated on the basis of the measurement result or the received information in the setting of the determination threshold value related to the state detection using the coupled state indicator. Note that the number of threshold values is not limited to one and a plurality of threshold value can be set in a stepwise manner as described above.

Next, processing of detecting a state using the Q factor measuring method and a method of measuring a coupled state between the power transmitting antenna and the power receiving antenna will be described. It is possible to perform the state detection with higher accuracy by using both the Q factor measuring method and the first or second measurement method together. The Q factor measuring method will be more specifically described with reference to FIGS. 11A and 11B.

Figures 11A, 11B:
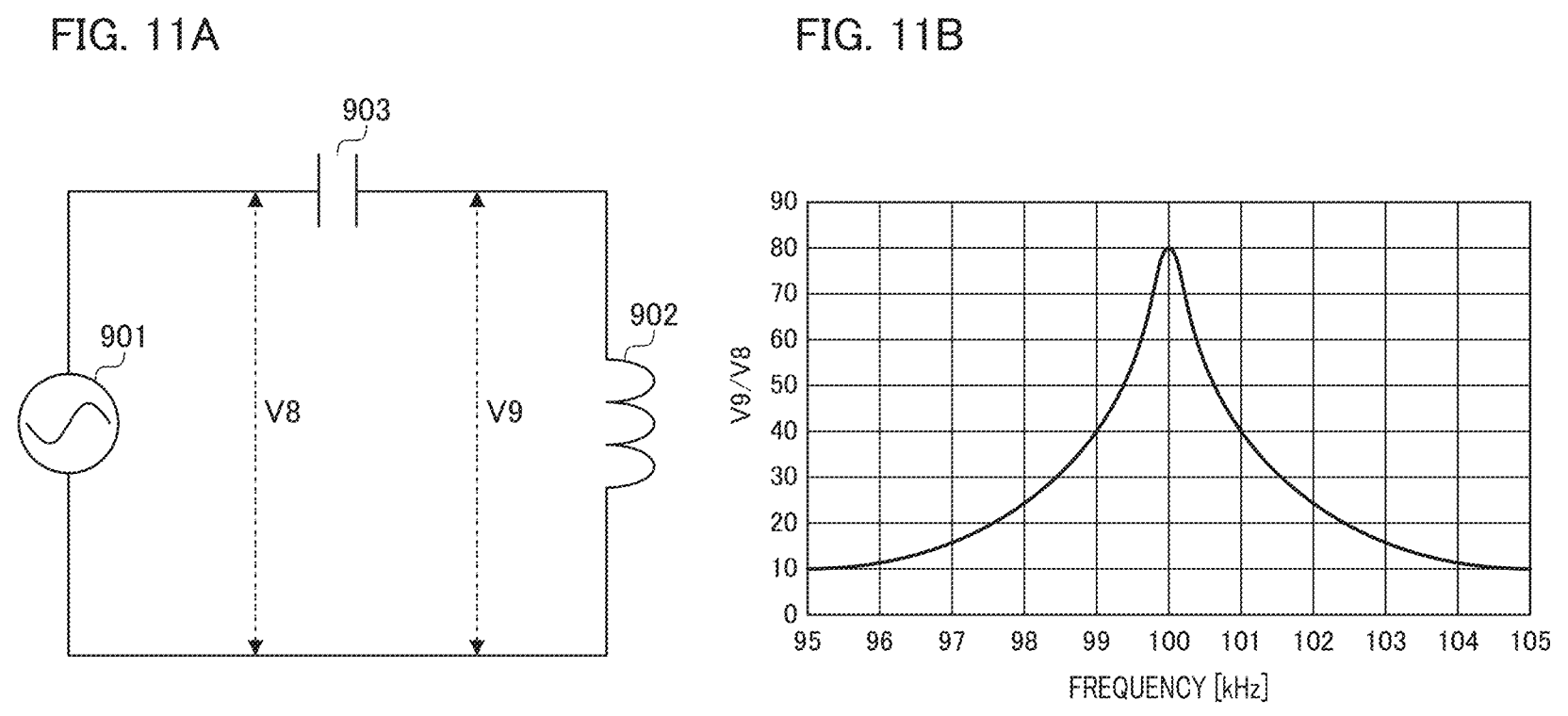

FIG. 11A is a schematic circuit diagram for explaining a Q-factor measurement method based on the Q factor measuring method. An AC power source 901 is a power source that outputs AC power generated by the power transmitting unit 103 of TX. A power transmitting coil 902 corresponds to the power transmitting antenna 105, and a capacitor 903 corresponds to the resonance capacitor 107. The power transmitting coil 902 and the capacitor 903 are connected in series. A voltage value V8 is a voltage value of a predetermined frequency that is generated by the power transmitting unit 103 to operate the wireless power transmission system. A voltage value V9 is a value of a voltage applied to the power transmitting coil 902. Here, it is assumed that TX can change the frequency related to the voltage value. In addition, the voltage values V8 and V9 are voltage values measured by TX when TX transmits Analog Ping or Digital Ping to RX. Note that since the voltage values V8 and V9 are AC voltage values, a root mean square (RMS) value thereof may be used.

FIG. 11B illustrates a property having a peak at 100 kHz as an example of a measurement result of V9/V8 with respect to a frequency. The horizontal axis represents a frequency axis, and the vertical axis represents a voltage ratio "V9/V8". Since V9/V8 represents the Q-factor related to the power transmitting coil 902, the value thereof changes if an object is placed in the vicinity of the power transmitting coil 902. Changes in Q-factor differ in each of a case where no object is placed on TX, a case where RX is placed on TX, a case where a foreign matter (a metal piece or the like) is placed on TX, and a case where RX and a foreign matter are placed on TX.

In the Negotiation Phase, TX receives a signal of an FOD Status Data Packet including a Reference Quality Factor Value and a Reference Resonance Frequency Value from RX. The Reference Quality Factor Value is a Q-factor that can be measured by the terminal of the power transmitting antenna of the test TX in a case where RX is placed on the test TX and no foreign matter is present nearby. In addition, the Reference Resonance Frequency Value is a resonance frequency that can be measured by the terminal of the power transmitting antenna of the test TX in a case where RX is placed on the test TX and no foreign matter is present nearby. In the Q factor measuring method, a threshold value is set with reference to a Reference Quality Factor Value. Foreign matter detection is performed by comparing the threshold value with the Q-factor obtained from actually measured V9/V8. Alternatively, a threshold value is set with reference to a Reference Resonance Frequency Value. Foreign matter detection is performed by comparing the threshold value with a resonance frequency obtained by actually measuring V9/V8.

Incidentally, although it is possible to perform detection mainly in a case between a foreign matter (a metal piece or the like) is mixed between TX and RX in the Q factor measuring method, accuracy of detecting positional deviation between the power transmitting antenna of TX and the power receiving antenna of RX is low. On the other hand, according to the method of measuring the coupled state, it is possible to detect the positional deviation between the power transmitting antenna of TX and the power receiving antenna of RX and to perform detection in a case where a foreign matter (a metal piece or the like) is mixed between TX and RX. TX and RX perform control as follows using the measurement values in each method.

Figure 12:
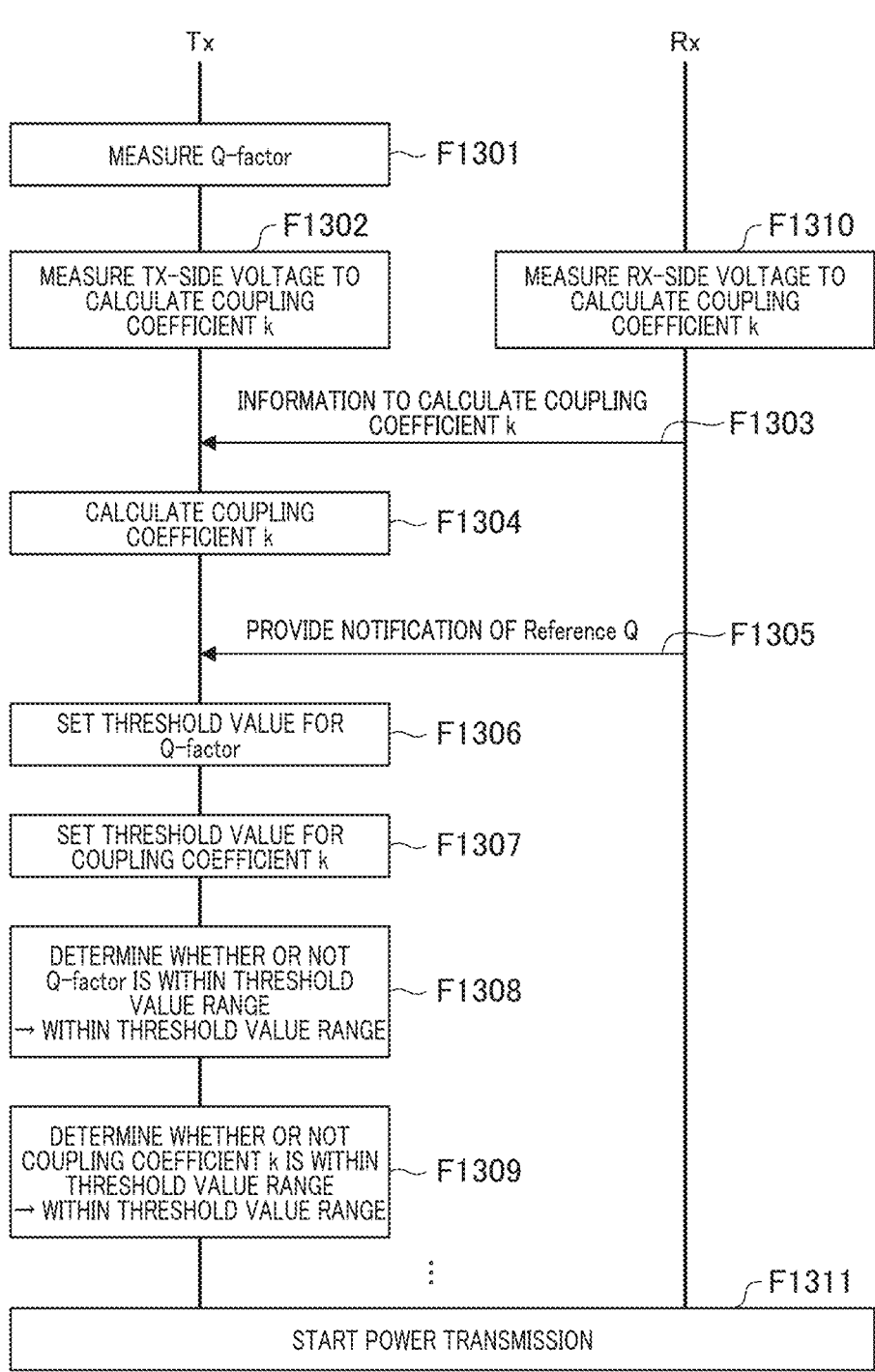
FIG. 12 is a sequence diagram for explaining an operation example according to a first embodiment.
Figure 13:
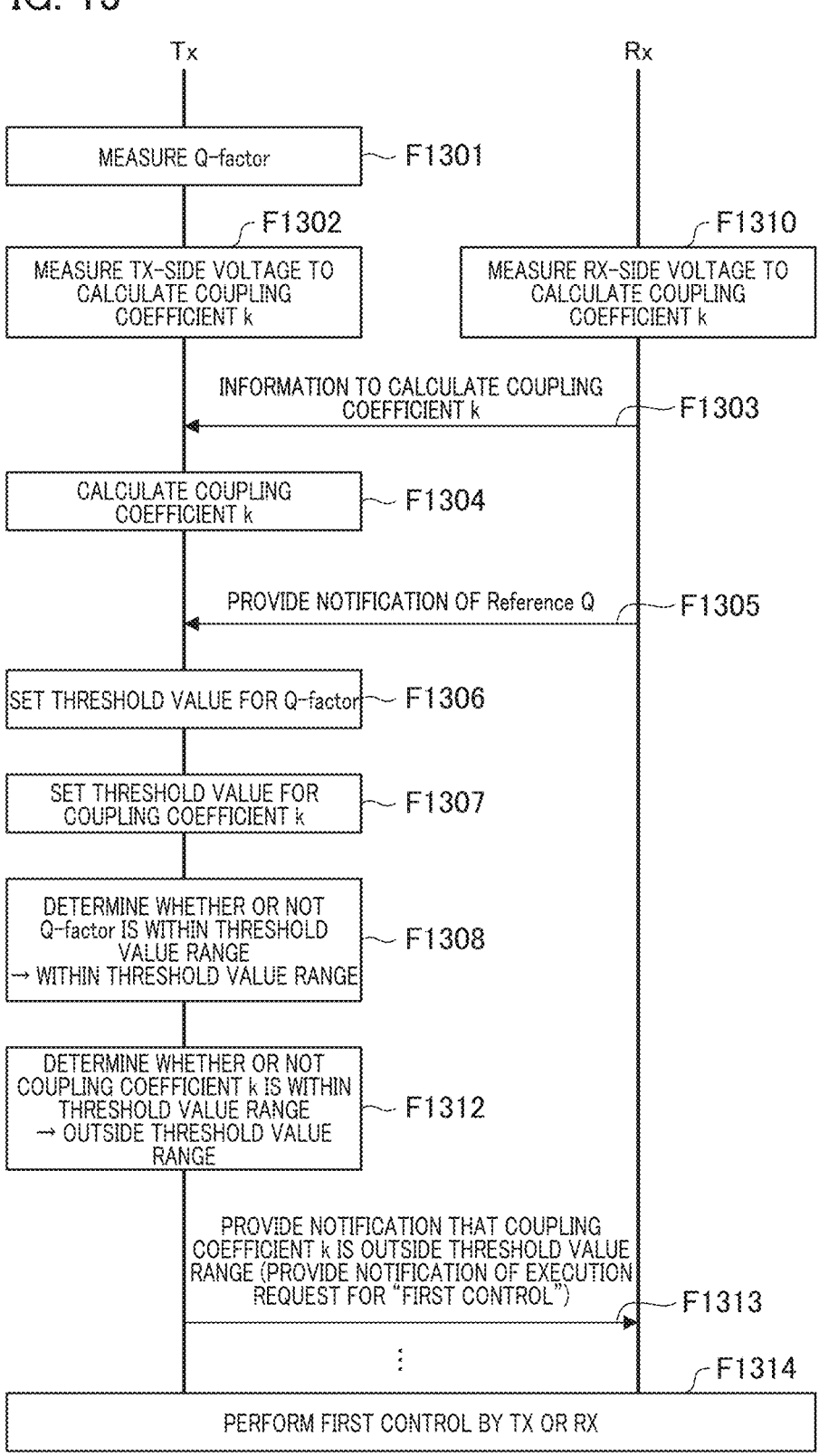
FIG. 13 is a sequence diagram for explaining another example of an operation according to the first embodiment.
Figure 14:
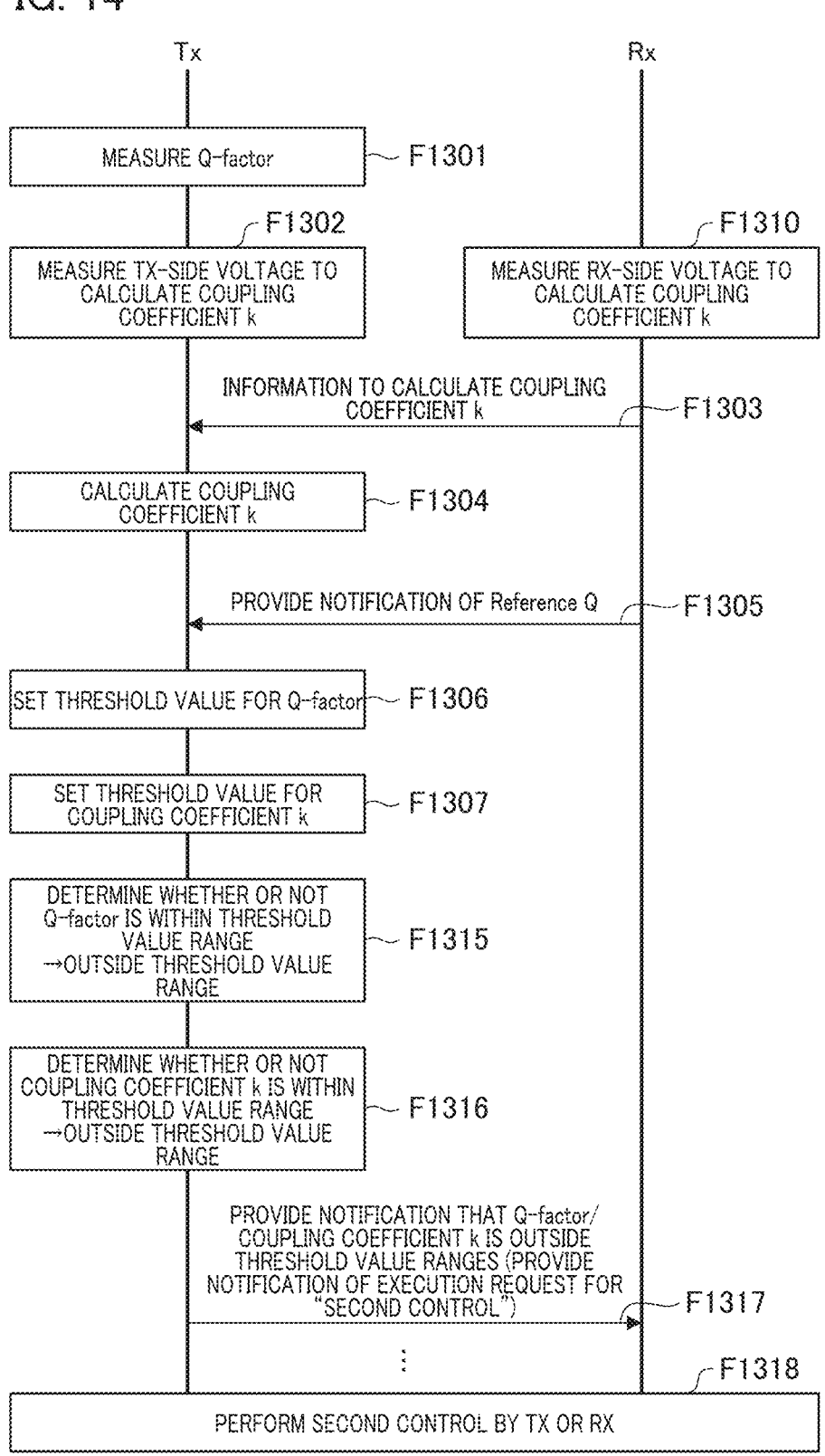
FIG. 14 is a sequence diagram for explaining yet another example of an operation according to the first embodiment.

FIGS. 12 to 14 are sequence diagrams for explaining an example of a control method based on the measurement value in the Q factor measuring method and the measurement value in the method of measuring the coupled state. First, specific description will be given with reference to FIG. 12. Note that the coupling coefficient k is assumed to be used as the coupled state indicator. In F1301, TX measures the Q-factor on the basis of the Q factor measuring method. Next, in F1302, TX performs voltage measurement for calculating the coupling coefficient k on the basis of the first or second measurement method. Specifically, the aforementioned values V1, V3, V6, and V7 are acquired. RX performs voltage measurement to calculate the coupling coefficient k on the basis of the first measurement method in F1310 at the same timing. Specifically, the aforementioned values V2, V4, and V5 are acquired. Note that the voltage measurement on the RX side is not needed in the case where the second measurement method is used.

The measurement of the voltage values can be performed by each of TX and RX when TX transmits Analog Ping or transmits Digital Ping. In other words, the measurement in F1301, F1302, and F1310 may be performed at the same timing. It is thus possible to perform measurement in a short period of time.

Next, RX notifies TX that calculates the coupling coefficient k of information necessary to calculate the coupling coefficient k in F1303. Alternatively, in a case where the subject of the calculation of the coupling coefficient k is RX, TX notifies RX of information necessary to calculate the coupling coefficient k. The information necessary to calculate the coupling coefficient is information regarding the aforementioned values V1 to V7, the values of the self-inductances L1 and L2, or constants calculated using electric properties of the power transmitting antenna and the power receiving antenna.

In F1304, TX performs processing of calculating the coupling coefficient k. Alternatively, RX may calculate the coupling coefficient k. Then, in F1305, RX notifies TX of the Reference Quality Factor Value and the Reference Resonance Frequency Value used in the Q factor measuring method. The notification method is as described above. In F1306, TX sets a threshold value of the Q-factor in the Q factor measuring method in accordance with the threshold value setting method. Alternatively, a threshold value of the resonance frequency in the Q factor measuring method is set. Next, TX sets a threshold value of the coupling coefficient k in the method of measuring the coupled state in accordance with the threshold value setting method in F1307.

In F1308, TX determines whether or not the measurement value of the Q-factor is within a first threshold value range. The first threshold value range is a reference for determination defined by the threshold value related to the Q-factor. Alternatively, the first threshold value range is a reference for determination defined by the threshold value related to the resonance frequency. Hereinafter, description of "measurement of the Q-factor" is assumed to include two kinds of measurement, namely the measurement of the Q-factor in the Q factor measuring method and the measurement of the resonance frequency in the Q factor measuring method. In addition, description of the "measurement value of the Q-factor" or the "value of the Q-factor" is assumed to include two measurement values, namely the measurement value of the Q-factor in the Q factor measuring method and the measurement value of the resonance frequency in the Q factor measuring method. Also, description of the "threshold value of the Q-factor" is assumed to include two threshold values, namely the threshold value related to the Q-factor in the Q factor measuring method and the threshold value related to the resonance frequency in the Q factor measuring method. Here, if the measurement value of the Q-factor is within the first threshold value range, the processing proceeds to next F1309, and TX determines whether or not the coupling coefficient k is within a second threshold value range. The second threshold value range is a reference for determination determined by the threshold value related to the coupling coefficient k. Here, the coupling coefficient k is assumed to be within the second threshold value range. In this case, since the coupling coefficient k is within the second threshold value range, and the measured Q-factor is within the first threshold value range, TX determines that "there is no abnormality in the vicinity of the power transmitting antenna and the power receiving antenna". Therefore, the processing proceeds to the Power Transfer Phase through each phase of the WPC standard, and TX starts to transmit power to RX in F1311.

The determination processing depending on whether or not the measurement result is within the predetermined range based on the set threshold value is an example. For example, the measurement of the Q-factor and the measurement of the coupling coefficient k are performed a plurality of times, and a difference between the measurement result previously obtained and the measurement result obtained this time is calculated. It is possible to determine that "there is no abnormality" or "there is a low probability of abnormality" in a case where the difference is equal to or less than a threshold value and to determine that "there is abnormality" or "there is a high probability of abnormality" in a case where the difference is greater than the threshold value. The determination method can also be applied to embodiments, which will be described later. Also, the order of F1301 to F1307 may differ. For example, although FIG. 12 illustrates the example in which the threshold value of the Q-factor and the threshold value of the coupling coefficient are set after the measurement of the Q-factor and the calculation of the coupling coefficient k, the order thereof may be opposite. Also, TX may transmit power to RX to satisfy maximum GP that can be transmitted.

TX performs state detection (detection of state abnormality, a foreign matter, and the like) using two parameters, namely the coupling coefficient k and the Q-factor (including the resonance frequency), and it is thus possible to perform the determination with higher accuracy. In other words, in a case where both the values of the coupling coefficient k and the Q-factor are within corresponding predetermined threshold value ranges, TX can determine that "there is no abnormality" with high accuracy.

Next, an example of FIG. 13 will be described. Since F1301 to F1308 and F1310 are similar to those in FIG. 12, description thereof will be omitted. After F1308, the processing proceeds to F1312. TX determines whether or not the coupling coefficient k is within the second threshold value range based on the threshold value. Here, it is assumed that the coupling coefficient k is outside the second threshold value range. In next F1313, TX notifies RX of the fact that the coupling coefficient k is outside the second threshold value range and a request to execute predetermined control (hereinafter, referred to as first control). Then, in F1314, TX or RX performs first control. The first control is control of addressing positional deviation between the power transmitting antenna and the power receiving antenna. Specific content of the first control will be described later.

According to the Q factor measuring method, although it is possible to detect mixing of a foreign matter (a metal piece or the like), accuracy of detection of the positional deviation between the power transmitting antenna and the power receiving antenna is low as described above. On the other hand, according to the method of measuring the coupled state between the power transmitting antenna and the power receiving antenna, it is possible to detect the positional deviation between the power transmitting antenna and the power receiving antenna and to detect mixing of a foreign matter (a metal piece or the like) as well. In the example in FIG. 13, the measurement value of the Q-factor by the Q factor measuring method is within the first threshold value range, and there is a low probability of mixing of a foreign matter between the power transmitting antenna and the power receiving antenna. Also, since the coupling coefficient k by the method of measuring the coupled state is outside the second threshold value range, there is a probability that positional deviation between the power transmitting antenna and the power receiving antenna has occurred.

First control content of the first control in F1314 is transmission of an end power transfer (EPT) command, which is a command to end the power transmission, from RX to TX. In a case where positional deviation has occurred, there is a probability of degradation of power transmission efficiency or a probability of an increase in noise in the surrounding environment. As a countermeasure, the power transmission from TX to RX is stopped, or transition to the Selection Phase which is an initial phase is performed through resetting. Note that the stopping of the power transmission is an example of restriction of power transmission, and TX transmits, to RX, a transmission request to request for a power transmission restriction notification request from RX. At that time, TX can provide a notification of a reason for the transmission request. RX determines whether or not to transmit the power transmission restriction notification request to TX on the basis of the transmission request. In a case where RX provides the notification request of power transmission restriction (for example, a change to a power value that is less than a rated power value or stopping of power transmission) to TX, TX performs control to restrict power transmission.

Second control content in the first control in F1314 is performing notification processing in which RX encourages a user to rearrange RX on TX. This can be realized by providing various outputs to the user using the UI unit 202, for example. The various outputs are operations such as screen display on a liquid crystal panel or the like, blinking or a color change of an LED, sound output through a speaker, and vibration of the RX main body caused by a vibration motor or the like. In a case where RX on TX is located at an optimal position through the notification to the user, the probability that power transmission is appropriately performed from TX to RX increases.

Third control content in the first control in F1314 is control of automatically adjusting the positions of the power transmitting antenna and the power receiving antenna and increasing the coupling coefficient k by TX or RX. In this case, it is assumed that TX or RX has a mechanism unit of moving or changing the postures of the power transmitting antenna or the power receiving antenna. For example, TX performs control of adjusting the position or the posture of the power transmitting antenna with respect to the power receiving antenna by the mechanism unit. Alternatively, TX transmits a request for control of adjusting the position or the posture of the power receiving antenna with respect to the power transmitting antenna to RX. RX receives the request and performs control of adjusting the position or the posture of the power receiving antenna with respect to the power transmitting antenna by the mechanism unit. Alternatively, RX transmits a request for control of adjusting the position or the posture of the power transmitting antenna with respect to the power receiving antenna to TX. TX receives the request and performs control of adjusting the position or the posture of the power transmitting antenna with respect to the power receiving antenna by the mechanism unit. TX or RX performs processing of automatically adjusting the relative positions of the power transmitting antenna and the power receiving antenna, appropriately or periodically measuring the coupling coefficient k, and searching for optimal relative positions. In this manner, in a case where RX on TX is located at an optimal position, the probability of appropriate power transmission from TX to RX increases.

Fourth control content in the first control in F1314 is setting a power value that is less than a threshold value by TX through negotiation with RX based on mutual communication and performing power transmission from TX to RX. For example, a minimum power value is set as the GP value, and TX performs power transmission to RX. An effect that transmitted power from TX to RX decreases and noise emitted to the surrounding environment at the time of power transmission decreases is achieved. Note that TX may transmit power to RX by changing the GP value in accordance with the value of the coupling coefficient k. GP is set to 5 (W) in a case where the coupling coefficient k is smaller than the threshold value (for example, k=0.3), and GP is set to 10 (W) in a case where the coupling coefficient k is greater than the threshold value (for example, k=0.6). In a case where the coupling coefficient k is yet larger (for example, k=0.9), GP is set to 15 (W), and TX performs power transmission with the maximum power that can be transmitted to RX. The threshold value range of the coupling coefficient k is set in a stepwise manner and the GP value is changed, or processing of successively changing the GP value corresponding to the coupling coefficient k is performed, to thereby control the transmitted power. Also, GP may be replaced with the Maximum Power Value that is a value specifying the maximum power or the Reference Power.

Fifth control content in the first control in F1314 is changing a frequency band used by TX and RX for power transmission. Power transmission efficiency in the wireless power transmission is determined by a product of the coupling coefficient k and the Q-factor. The coupling coefficient k outside the predetermined threshold value range means that the power transmission efficiency is degraded. On the other hand, since the coupling coefficient k and the Q factor have frequency properties, the coupling coefficient k and the Q-factor change by changing the frequency band used for the wireless power transmission. As a result, it is possible to improve the power transmission efficiency. For example, TX transmits power to RX by changing the frequency band used for the wireless power transmission in accordance with the acquired value of the coupling coefficient k. In a case where the value of the coupling coefficient k is smaller than the threshold value (for example, k=0.3), TX transmits power to RX by setting a first frequency band. In a case where the coupling coefficient k is equal to or greater than the threshold value (for example, k=0.6), TX transmits power to RX by setting a second frequency band. In a case where the value of the coupling coefficient k is yet larger (for example, k=0.9), TX transmits power to RX by setting a third frequency band. The threshold value range for the coupling coefficient k is set in a stepwise manner, and TX changes the frequency band to be used to transmit power to RX. Also, TX may successively change the frequency band in accordance with the coupling coefficient k. Alternatively, a value calculated from the coupling coefficient k and the Q-factor (for example, a product between the coupling coefficient k and the Q-factor) may be used instead of the coupling coefficient. TX changes the frequency band to be used in accordance with the value calculated from the coupling coefficient k and the Q-factor and transmits power to RX. Also, in a case where TX receives information regarding the received power value from RX, TX can use the received power value of RX instead of the coupling coefficient. In other words, TX transmits power to RX by changing the frequency band to be used in accordance with the information regarding the received power value received from RX.

The change in frequency band used for the power transmission can be realized by changing the circuit configuration of each of TX and RX. For example, there is a configuration in which switching is achieved using a switch from the resonance capacitor 107 connected to the power transmitting antenna 105 of TX to a resonance capacitor (not illustrated) of another constant. The frequency band used by TX and RX for power transmission is basically determined by the electric property of the power transmitting antenna 105 and the constant value (electrostatic capacitance) of the resonance capacitance. Therefore, it is only necessary to switch the resonance capacitor 107 to a capacitance of another constant value in accordance with the frequency band to be used. In other words, the resonance capacitor is configured such that resonance capacitor to be connected to the power transmitting antenna 105 is changed by switching in accordance with the value of the coupling coefficient k. Also, RX is also similarly configured to switch the resonance capacitor 211 to a capacitor of another constant value in accordance with the frequency band to be used. In other word, a configuration in which the resonance capacitor connected to the power receiving antenna 205 is changed by switching the resonance capacitor in accordance with the value of the coupling coefficient k is employed. Also, the timing at which TX or RX switches the resonance capacitor is after the device that changes the frequency provides a notification to a device opposing the device. For example, TX (or RX) determines to change the frequency band to be used for the power transmission and provides a notification indicating that the determination has been made to RX (or TX) through communication, and TX and RX then switch the resonance capacitors thereof. Note that a method of changing the circuit configuration of TX or RX other than the resonance capacitor in accordance with the value of the coupling coefficient k may be employed.

Although it is possible to address positional deviation between the power transmitting antenna and the power receiving antenna in F1314, large noise may occur if the amount of leaking magnetic flux is large in a case where positional deviation has occurred. In addition, the frequency band in which noise occurs differs depending on the frequency band used by TX and RX for power transmission. Therefore, TX and RX may change the frequency band to be used for power transmission in accordance with the value of the coupling coefficient k such that the frequency at which noise occurs changes. In other words, in a case where it is desired to curb noise occurring at a predetermined frequency band, TX and RX change the frequency band to be used for power transmission such that noise at the frequency band decreases. In addition, TX and RX switch a configuration of a noise curbing circuit in accordance with the value of the coupling coefficient k. Alternatively, TX and RX switch the configuration of the noise curbing circuit in accordance with the frequency band to be used for power transmission. The noise curbing circuit is a capacitor, an inductor, a filter, or the like in each of circuits of TX and RX. A switching timing is similar to that in the aforementioned method. Also, the first to fourth control content may be appropriately switched in accordance with the value of the coupling coefficient and the like.

Next, an example in FIG. 14 will be described. Since F1301 to F1307 and F1310 are similar to those in FIG. 12, description thereof will be omitted. After F1307, the processing proceeds to F1315. In F1315, TX determines whether or not the measurement value of the Q-factor is within the first threshold value range. Here, it is assumed that the measurement value of the Q-factor is outside the first threshold value range. Next, in F1316, TX determines whether or not the value of the coupling coefficient k is within the second threshold value range. Here, it is assumed that the value of the coupling coefficient k is outside the second threshold value range, and the processing proceeds to F1317. TX notifies RX of the fact that both the Q-factor and the coupling coefficient k are outside the threshold value ranges and an execution request for predetermined control (hereinafter, referred to as second control). Next, in F1318, TX or RX performs the second control. The second control is control of addressing mixture of a foreign matter between the power transmitting antenna and the power receiving antenna. Specific content of the second control will be described later.

According to the Q factor measuring method, it is possible to perform detection in a case where a foreign matter (a metal piece or the like) is mixed between the power transmitting antenna and the power receiving antenna. Also, according to the method of measuring the coupled state between the power transmitting antenna and the power receiving antenna, the coupling coefficient k decreases due to mixing of a foreign matter, and it is thus possible to detect a probability of mixing of a foreign matter. In the example in FIG. 14, the measurement value of the Q-factor is outside the first threshold value range, and there is thus a high probability of mixing of a foreign matter between the power transmitting antenna and the power receiving antenna. Since the coupling coefficient k acquired by the method of measuring the coupled state is outside the second threshold value range, there is a probability of mixing of a foreign matter between the power transmitting antenna and the power receiving antenna. Both the two methods indicate that there is a probability of mixing of a foreign matter (a metal piece or the like) between the power transmitting antenna and the power receiving antenna. Therefore, TX determines that "there is a rather high probability of mixing of a foreign matter between the power transmitting antenna and the power receiving antenna".

First control content in the second control in F1318 is transmission of an end power transfer (EPT) command which is a command to end the power transmission from RX to TX. In the case where a foreign matter (a metal piece or the like) is mixed between the power transmitting antenna and the power receiving antenna, there is a probability of occurrence of heat generation of the foreign matter. Therefore, control of stopping the power transmission from TX to RX or transitioning to the Selection Phase which is an initial phase through resetting is performed. Note that the stopping of the power transmission is an example of power transmission restriction.

Second control content in the second control in F1318 is notification processing performed by TX or RX for the user. The notification for the user is a notification of encouraging the user to remove the foreign matter that is present between the power transmitting antenna and the power receiving antenna or on the power transmitting antenna. This can be realized by providing various outputs to the user using the UI unit 202 of RX, for example. The various outputs include operations such as screen display of a liquid crystal panel, blinking or a color change of an LED, a sound output through a speaker, and vibration of the RX main body caused by a vibration motor. Note that the various outputs in F1318 are outputs that are different from the various outputs in F1314 and control is performed such that the user can identify both kinds of outputs. In this manner, the user can clearly distinguish whether there is a probability of occurrence of positional deviation between the power transmitting antenna and the power receiving antenna or whether there is a probability of mixing of a foreign matter between the power transmitting antenna and the power receiving antenna. In a case where the foreign matter has been removed in response to the notification to the user, the probability of more appropriate power transmission from TX to RX increases. Alternatively, TX may have a function similar to that of the UI unit 202 of RX and provide a notification to encourage the user to remove the foreign matter on TX.

Third control content in the second control in F1318 is setting a power value that is less than a threshold value through negotiation of TX with RX based on mutual communication and performing power transmission. For example, a minimum power value is set as the GP value, and TX performs power transmission to RX. An effect that transmitted power from TX to RX decreases and the amount of heat generation of the foreign matter decreases is achieved. Note that the GP value may be changed in accordance with the coupling coefficient k or the Q-factor or the coupling coefficient k and the value of the Q-factor, and TX may transmit power to RX.

Fourth control content in the second control in F1318 is changing the frequency band to be used for power transmission by TX and RX. This is similar to the fifth control content in the first control explained in F1314. The Q-factor and the coupling coefficient k outside the predetermined threshold value ranges mean that the power transmission efficiency decreases. It is possible to improve the power transmission efficiency by changing the frequency band to be used for the wireless power transmission. For example, there is a method of changing the frequency band to be used for the wireless power transmission in accordance with the coupling coefficient k or the Q-factor value. Also, there is a method of changing the frequency band to be used for the wireless power transmission in accordance with a product between the coupling coefficient k and the Q-factor as a value calculated from these values. Alternatively, in a case where TX receives information regarding the received power value from RX, there is a method of changing the frequency band to be used for the wireless power transmission in accordance with the received power value. Also, TX and RX may change the frequency band to be used for power transmission in accordance with the value of the coupling coefficient k such that the frequency at which noise occurs changes. In other words, in a case where it is desired to curb noise occurring at a predetermined frequency band, there is a method in which TX and RX change the frequency band to be used for power transmission such that the noise at the frequency band decreases. Note that the change in frequency band can be realized by a known method such as by changing the circuit configurations of TX and RX. The timing at which the circuit configuration is changed is after the device that changes the frequency band provides a notification to a device opposing the device (see F1314).

Fifth control content in the second control in F1318 is checking temperature detection information obtained by a temperature sensor that TX or RX has in the vicinity of the power transmitting antenna or the power receiving antenna. For example, in a case where a foreign matter is present on TX, there is a probability that the foreign matter has generated heat. TX compares the detection value of the temperature sensor with a threshold value. In a case where the detection value is greater than the threshold value, power transmission from TX to RX is restricted (including power transmission stopping), or the operation state is changed through resetting. For example, control of transitioning to the Selection Phase which is the initial phase through resetting is performed. Alternatively, RX compares the detection value of the temperature sensor with the threshold value. In a case where the detection value is greater than the threshold value, RX transmits an execution request to TX to restrict power transmission from TX to RX (including power transmission stopping) or change the operation state through resetting. Also, the first to fourth control content may be appropriately switched in accordance with the Q-factor or the value of the coupling coefficient k, or a value calculated from the Q-factor and the coupling coefficient k.

Next, a case which does not correspond to FIGS. 12 to 14 will be described. A case where the measurement value of the Q-factor is outside the first threshold value range as a first determination result and the value of the coupling coefficient k is within the second threshold value range as a second determination result is assumed. In this case, TX determines that there is a probability of mixing of a foreign matter on the power transmitting antenna from the first determination result and performs control similar to the second control in F1318. Alternatively, TX and RX perform remeasurement related to the coupling coefficient k and the Q-factor.

Figure 15:
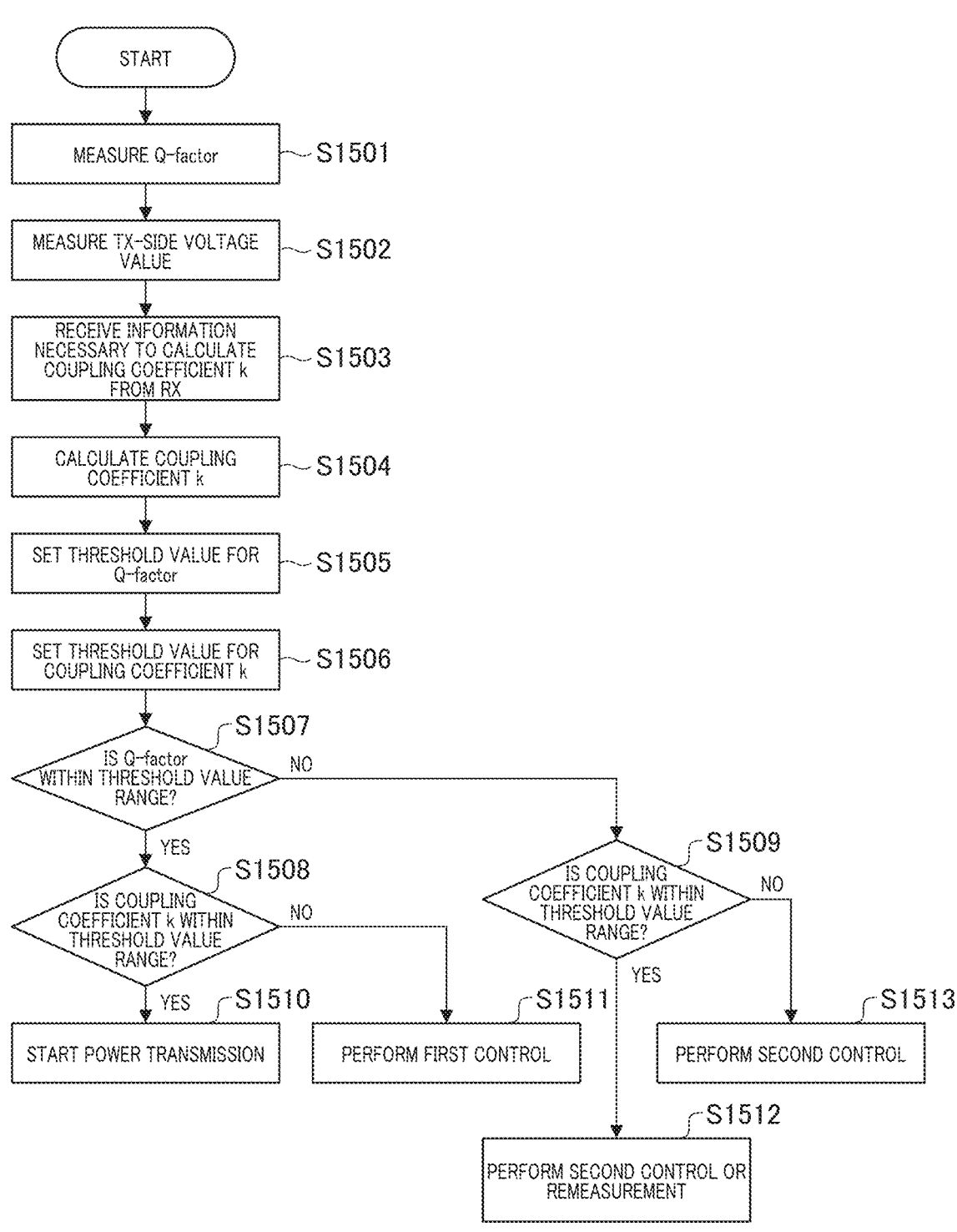
FIG. 15 is a flowchart for explaining processing of a power transmitting device according to the first embodiment.
Figure 16:
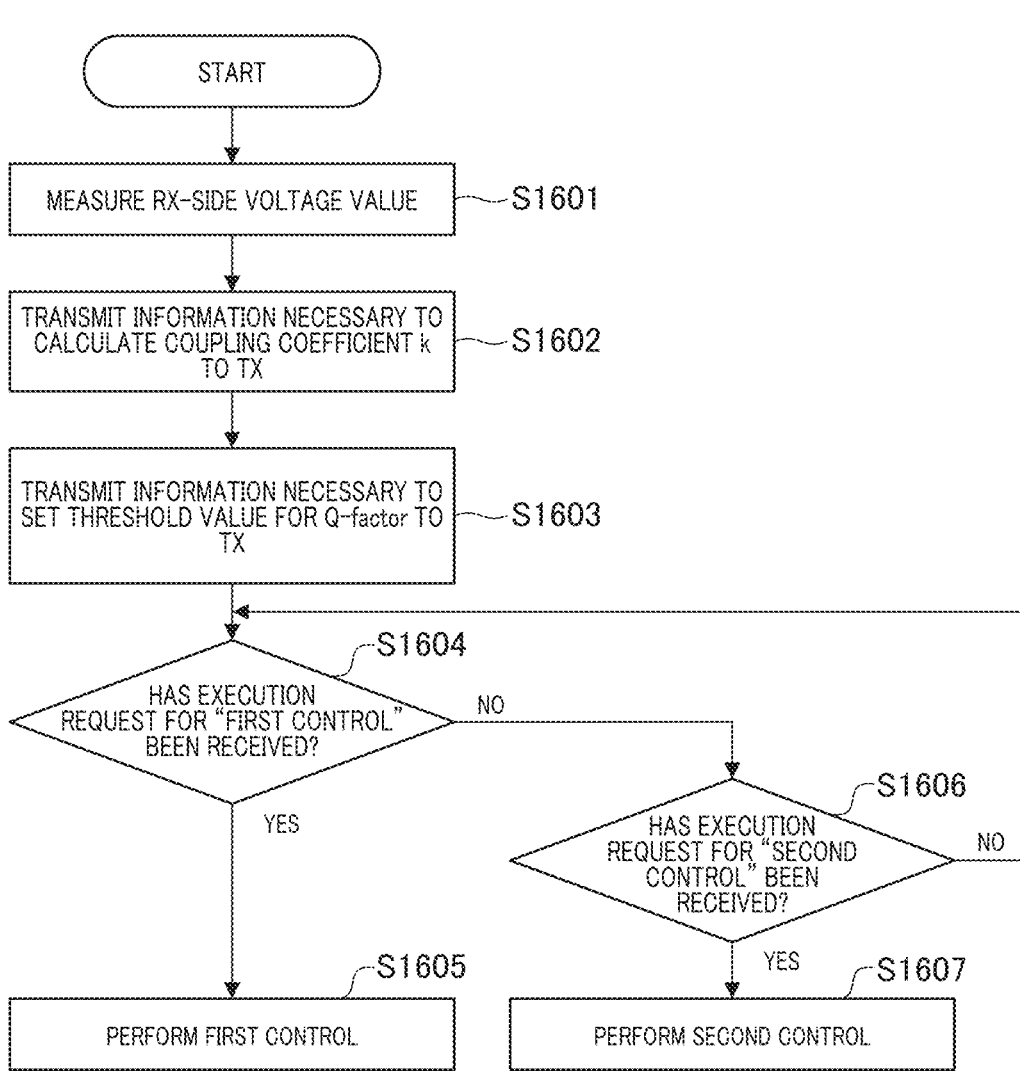
FIG. 16 is a flowchart for explaining processing of a power receiving device according to the first embodiment.

An operation example in the present embodiment will be described with reference to FIGS. 15 and 16. FIG. 15 is a flowchart for explaining operations of TX. FIG. 16 is a flowchart for explaining operations of RX.

In S1501 in FIG. 15, measurement of the Q-factor is performed. Next, in S1502, TX performs measurement of a voltage value by the waveform decay method and the method of measuring the coupled state. In S1503, TX receives information necessary to calculate the coupling coefficient k from RX. In S1504, TX calculates the value of the coupling coefficient k. TX sets a threshold value for the Q-factor in S1505 and sets a threshold value for the coupling coefficient k in S1506.

In S1507, TX determines whether the measurement value of the Q-factor satisfies a first condition. The first condition is that the measurement value of the Q-factor is within the first threshold value range. The processing proceeds to S1508 in a case where the first condition is satisfied, or the processing proceeds to S1509 in a case where the first condition is not satisfied. In S1508, TX determines whether or not the calculated value of the coupling coefficient k satisfies a second condition. The second condition is that the value of the coupling coefficient k is within a second threshold value range. The processing proceeds to S1510 in a case where the second condition is satisfied, or the processing proceeds to S1511 in a case where the second condition is not satisfied. Since the processing in S1509 is the same as that in S1508, description will be omitted. The processing proceeds to S1512 in a case where the second condition is satisfied in S1509, or the processing proceeds to S1513 in a case where the second condition is not satisfied.

In S1510, TX executes processing of starting power transmission. Also, the first control is performed in S1511. In S1512, the second control is performed, or remeasurement of the coupling coefficient k and the Q-factor is performed. In S1513, the second control is performed.

On the other hand, RX performs measurement of a voltage value by the waveform decay method and the method of measuring the coupled state in S1601 in FIG. 16. In S1602, RX transmits information necessary to calculate the coupling coefficient k to TX. In S1603, RX transmits information (the Reference Quality Factor Value and the Reference Resonance Frequency Value) necessary to set the threshold value for the Q-factor to TX. Next, the processing proceeds to S1604.

In S1604, RX determines whether or not an execution request for the first control has been received from TX. The processing proceeds to S1605 in a case where the execution request has been received, or the processing proceeds to S1606 in a case where the execution request has not been received. Also, in S1606, RX determines whether or not an execution request for the second control has been received from TX. The processing proceeds to S1607 in a case where the execution request has been received, or the processing moves on to S1604 in a case where the execution request has not been received. RX performs the first control in S1605 and performs the second control in S1607.

According to the present embodiment, it is possible to perform more appropriate control by using a plurality of detection methods related to the detection of the state between the power transmitting antenna and the power receiving antenna in the wireless power transmission together.

Second Embodiment

A second embodiment will be described with reference to FIGS. 17 to 23. In the present embodiment, a method of detecting a state with higher accuracy using three methods will be described. The three methods are the Power Loss method, the waveform decay method, and the method of measuring a coupled state of a power transmitting antenna and a power receiving antenna. Features of each method are as follows.

According to the waveform decay method, although it is possible to perform detection in a case where a foreign matter (a metal piece or the like) is mixed between TX and RX, accuracy of detection of positional deviation between the power transmitting antenna and the power receiving antenna is low. Also, according to the method of measuring the coupled state between the power transmitting antenna and the power receiving antenna and the Power Loss method, it is possible to detect positional deviation between the power transmitting antenna and the power receiving antenna, and it is also possible to perform detection in a case where a foreign matter (a metal piece or the like) is mixed between TX and RX. In the present embodiment, description of matters similar to those in the first embodiment will be omitted, and differences will be mainly described. The following control is performed using three measurement results obtained by performing the methods.

FIGS. 17 to 20 are sequence diagrams for explaining control in the present embodiment. As an assumption, it is assumed that a state determination threshold value in each method is set in a phase before power transmission is started (before a Power Transfer Phase) by a method similar to that in the first embodiment. However, it is possible to execute processing of setting a threshold value in each method in the Power Transfer Phase by the method similar to that in the first embodiment.

First, an example in FIG. 17 will be described. In F1501, power transmission from TX to RX is started. In F1502, RX transmits a Received Power Data Packet (mode0) including information regarding a received power value to TX. The Received Power Data Packet (mode0) will be abbreviated as "RP0". In F1503, TX performs state detection based on the Power Loss method using the information regarding the received power value of RX included in RP0. A state detection result here is assumed to indicate that the received power value of RX is within the threshold value range and "there is no abnormality".

Next, in F1504, TX measures a waveform decay indicator by the waveform decay method. It is assumed that a Q-factor is used as the waveform decay indicator. Here, the measurement of the waveform decay indicator by the waveform decay method will be described as "Q-factor measurement". Next, in F1505, TX performs voltage measurement to calculate a coupling coefficient k on the basis of the first or second measurement method. Specifically, the aforementioned values V1, V3, V6, and V7 are acquired. On the other hand, RX performs voltage measurement on the RX side to calculate the coupling coefficient k on the basis of the first measurement method in F1506 at the same timing. Specifically, the aforementioned values V2, V4, and V5 are acquired. Note that the voltage measurement on the RX side is not needed in a case where the second measurement method is used. TX can measure the voltage value occurring at the time of power transmission to RX, and RX can measure the voltage value occurring at the time of power reception from TX. In other words, the measurement in F1504, F1505, and F1506 may be performed in the same period of time.

Also, RP0 indicated in F1502 may include a request for TX to perform F1504. RP0 may include a result of measuring the voltage by RX in F1506. It is thus possible to shorten the processing time. Also, a Received Power Data Packet (mode1) (hereinafter, abbreviated as RP1) or a Received Power Data Packet (mode2) (hereinafter, abbreviated as RP2) may be used instead of RP0. Note that this method can also be applied to the first embodiment.

Next, in F1507, RX notifies TX of information to calculate the coupling coefficient k. Alternatively, in a case where RX calculates the coupling coefficient k, TX notifies RX of information to calculate the coupling coefficient k. The information to calculate the coupling coefficient k includes the aforementioned values V1 to V7 and values of L1 and L2, a constant calculated by using electric properties of the power transmitting antenna and the power receiving antenna, and the like.

In addition, RP0 (or RP1 or RP2) may include information to calculate the coupling coefficient in F1507. It is thus possible to shorten the processing time. In F1508, TX calculates the coupling coefficient k. Alternatively, RX may calculate the coupling coefficient k. Next, in F1509, TX determines whether or not the value of the Q-factor is within the first threshold value range. Here, the processing proceeds to F1510 on the assumption that the value of the Q-factor is within the first threshold value range, and TX determines whether or not the value of the coupling coefficient k is within the second threshold value range. Here, it is assumed that the calculated value of the coupling coefficient k is within the second threshold value range.

Figure 17:
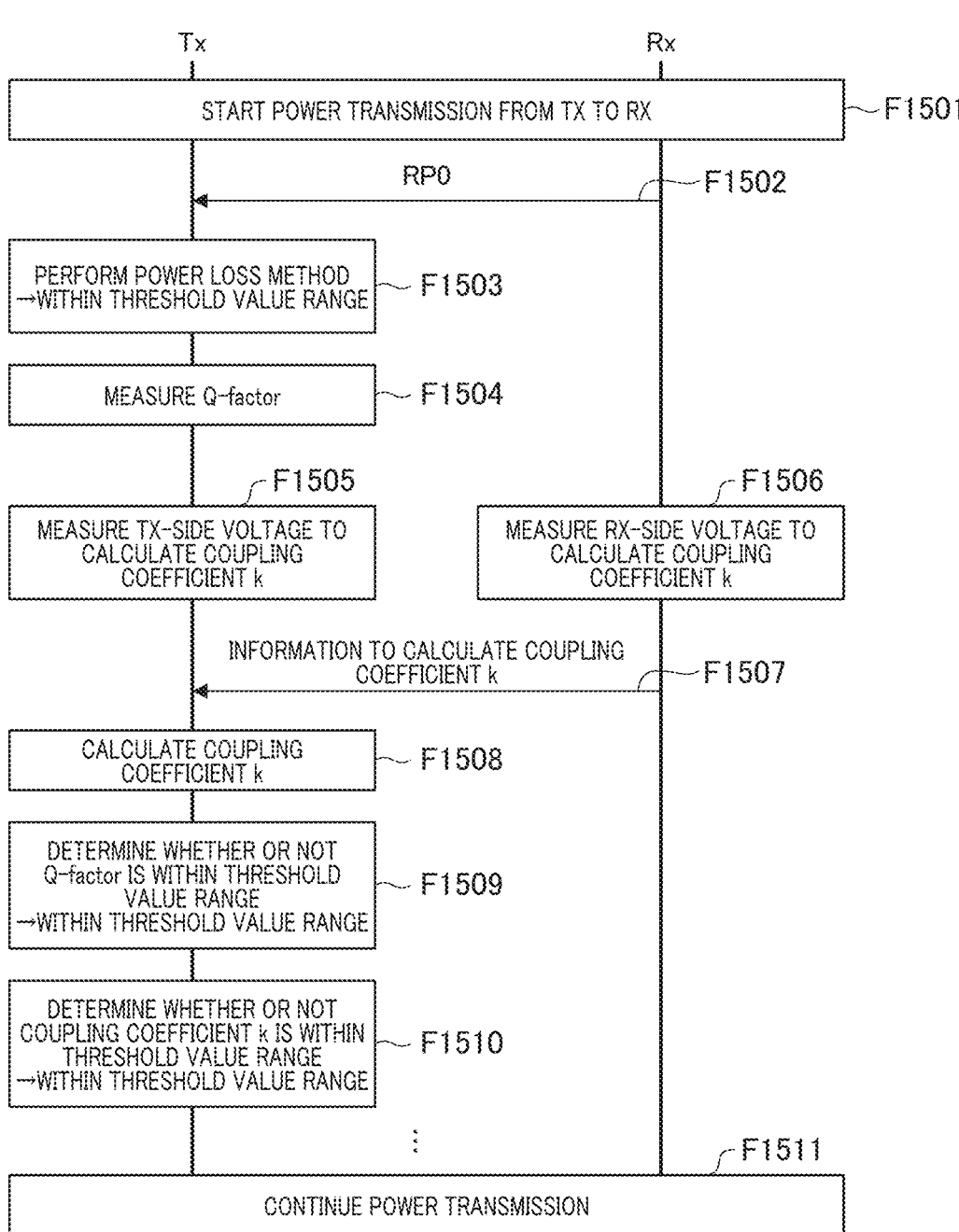
FIG. 17 is a sequence diagram for explaining an operation example according to a second embodiment.

In the example in FIG. 17, the received power value of RX is within the threshold value range, and each of the acquired values of the coupling coefficient k and the Q-factor is within its threshold value range. TX determines that "there is no abnormality in the vicinity of the power transmitting antenna and the power receiving antenna" and continues power transmission in F1511.

In a case where the Q-factor and the coupling coefficient k are measured a plurality of times, there is a method of performing determination related to state detection by comparing a difference between a measurement result previously obtained and a measurement result obtained this time with a threshold value. Also, in a case where TX receives RPO from RX a plurality of times, there is a method of performing determination related to state detection by comparing a difference between information previously received and information received this time with a threshold value. Also, the order from F1503 to F1510 may be changed. For example, the Power Loss method may be performed after the measurement of the Q-factor is performed first. Moreover, TX may transmit power to RX with the maximum GP that can be transmitted.

As described above, TX can perform the determination related to state detection with higher accuracy using the three parameters, namely the received power of RX, the coupling coefficient k, and the Q-factor. In a case where each of the values of the three parameters is within its threshold value range, for example, it is possible to obtain a determination result indicating that "there is no abnormality" with high accuracy.

Next, an example in FIG. 18 will be described. Since F1501 to F1509 are similar to those in FIG. 17, description thereof will be omitted. After F1509, the processing proceeds to F1512. In F1512, TX determines whether or not the value of the coupling coefficient k is within the second threshold value range, and it is assumed that the value of the coupling coefficient k is outside the second threshold value range. Next, in F1513, TX notifies RX of the fact that the value of the coupling coefficient k is outside the second threshold value range and an execution request for the first control. In F1514, TX or RX performs the first control.

Figure 18:
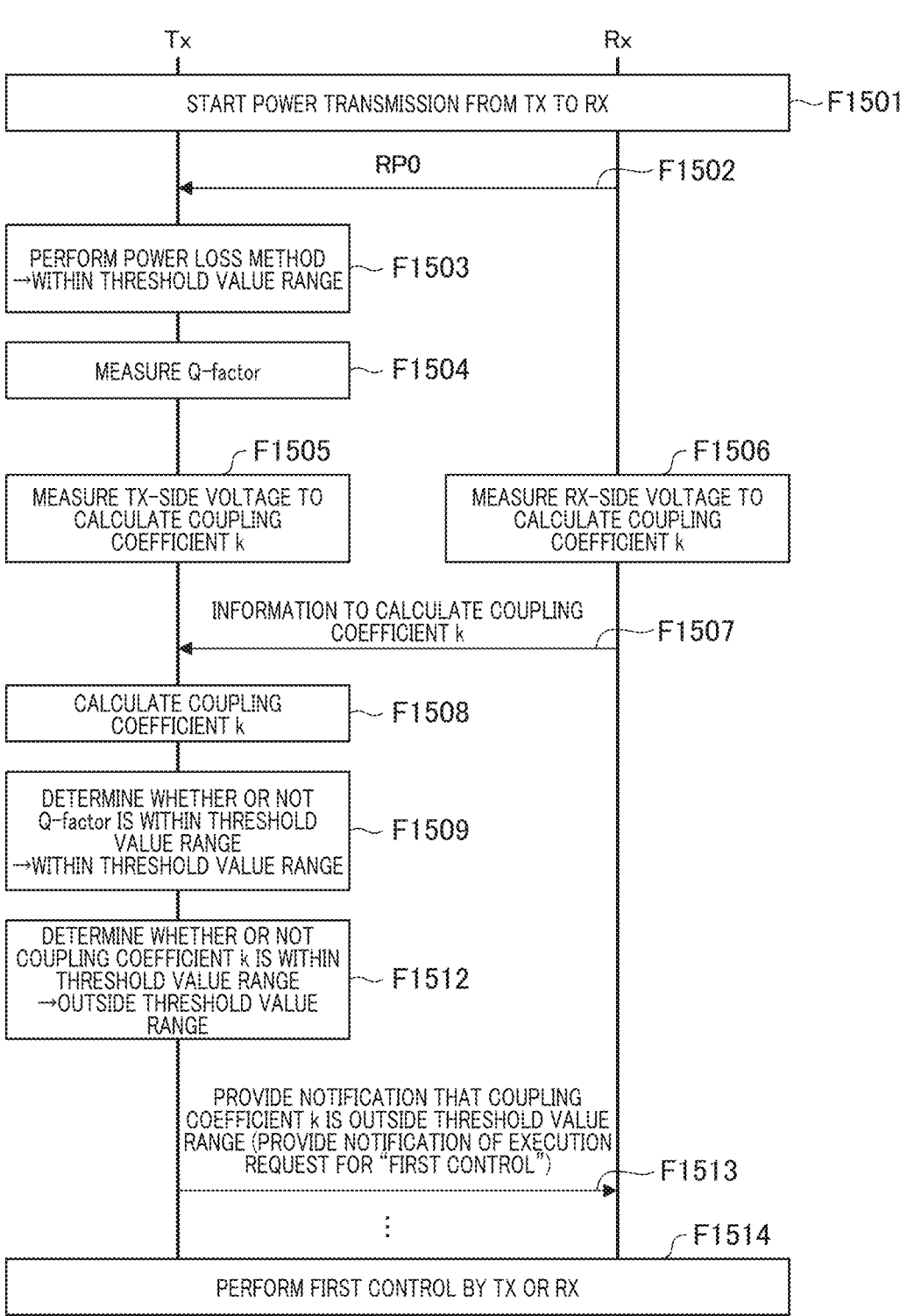
FIG. 18 is a sequence diagram for explaining another example of an operation according to the second embodiment.

Since each of the received power value of RX in the Power Loss method and the value of the Q-factor measured by the Q factor measuring method is within its threshold value range in the example in FIG. 18, there is a low probability of mixing of a foreign matter between the power transmitting antenna and the power receiving antenna. On the other hand, since the value of the coupling coefficient k acquired by the method of measuring the coupled state between the power transmitting antenna and the power receiving antenna is outside the threshold value range, there is a probability of occurrence of positional deviation between the power transmitting antenna and the power receiving antenna. Therefore, the first control, that is, control of addressing the positional deviation between the power transmitting antenna and the power receiving antenna is performed in F1514.

Next, an example in FIG. 19 will be described. F1515 which is a difference from that in FIG. 18 will be described. After F1502, the processing proceeds to F1515. In F1515, TX compares the received power value included in RP0 received from RX with the threshold value and performs state detection based on the Power Loss method. Here, it is assumed that the received power value is outside the threshold value range and a state detection result "there is a probability of state abnormality" or "there is abnormality" has been obtained.

Figure 19:
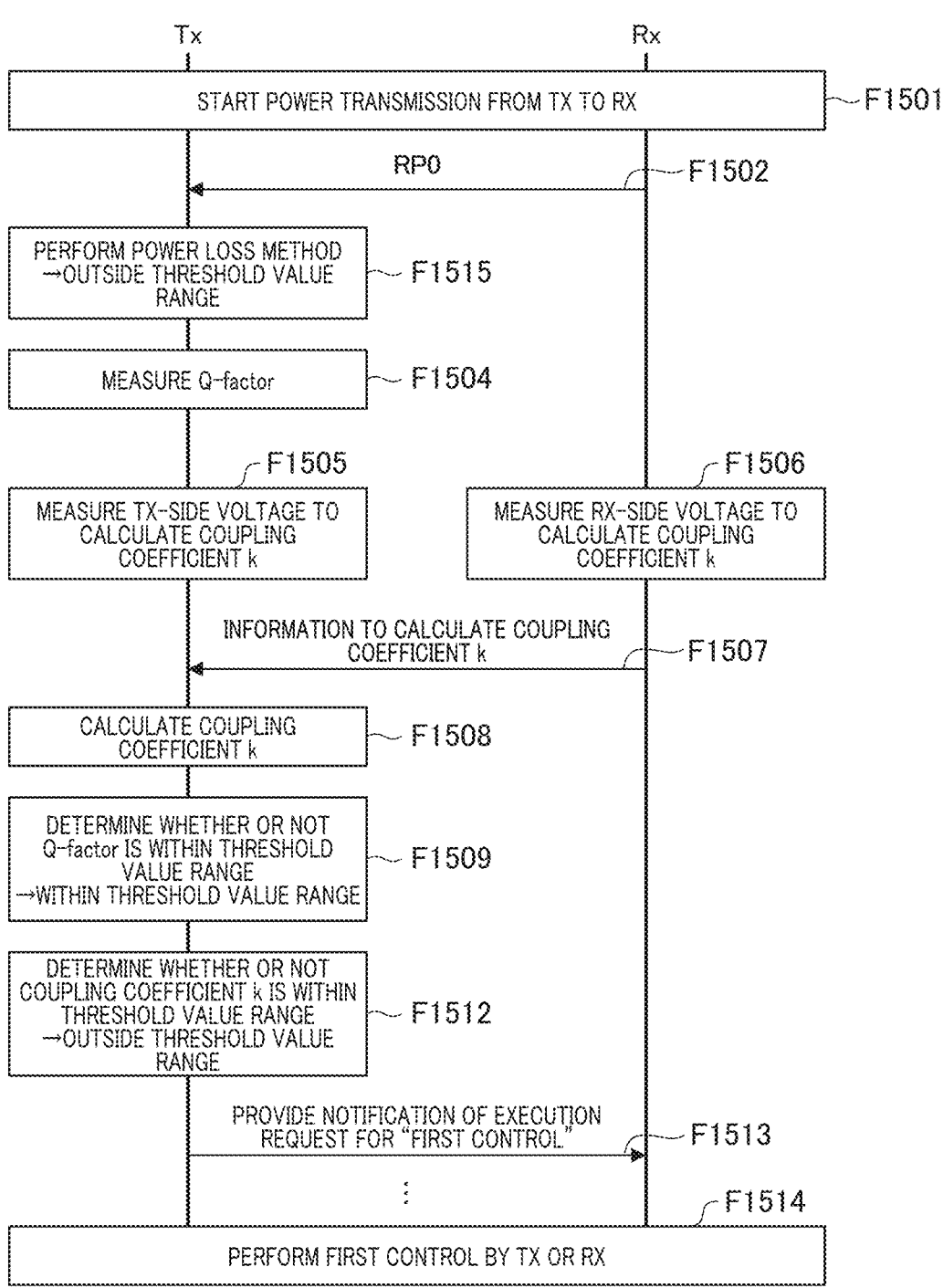
FIG. 19 is a sequence diagram for explaining yet another example of an operation according to the second embodiment.

In the example in FIG. 19, the value of the Q-factor is within the first threshold value range, and there is thus a low probability of mixing of a foreign matter between the power transmitting antenna and the power receiving antenna. On the other hand, since each of the received power value of RX in the Power Loss method and the value of the coupling coefficient k in the method of measuring the coupled state between the power transmitting antenna and the power receiving antenna is outside its threshold value range, there is a probability of occurrence of positional deviation between the power transmitting antenna and the power receiving antenna. Therefore, the first control is performed in F1514.

As described above, according to the determination result in each of the Power Loss method and the method of measuring the coupled state capable of detecting positional deviation between the power transmitting antenna and the power receiving antenna, the measurement value is outside the threshold value range. It is determined that positional deviation between the power transmitting antenna and the power receiving antenna has occurred with a higher probability as compared with the example in FIG. 18. Alternatively, a determination result that "there is a high probability of occurrence of positional deviation between the power transmitting antenna and the power receiving antenna" is obtained.

Figure 20:
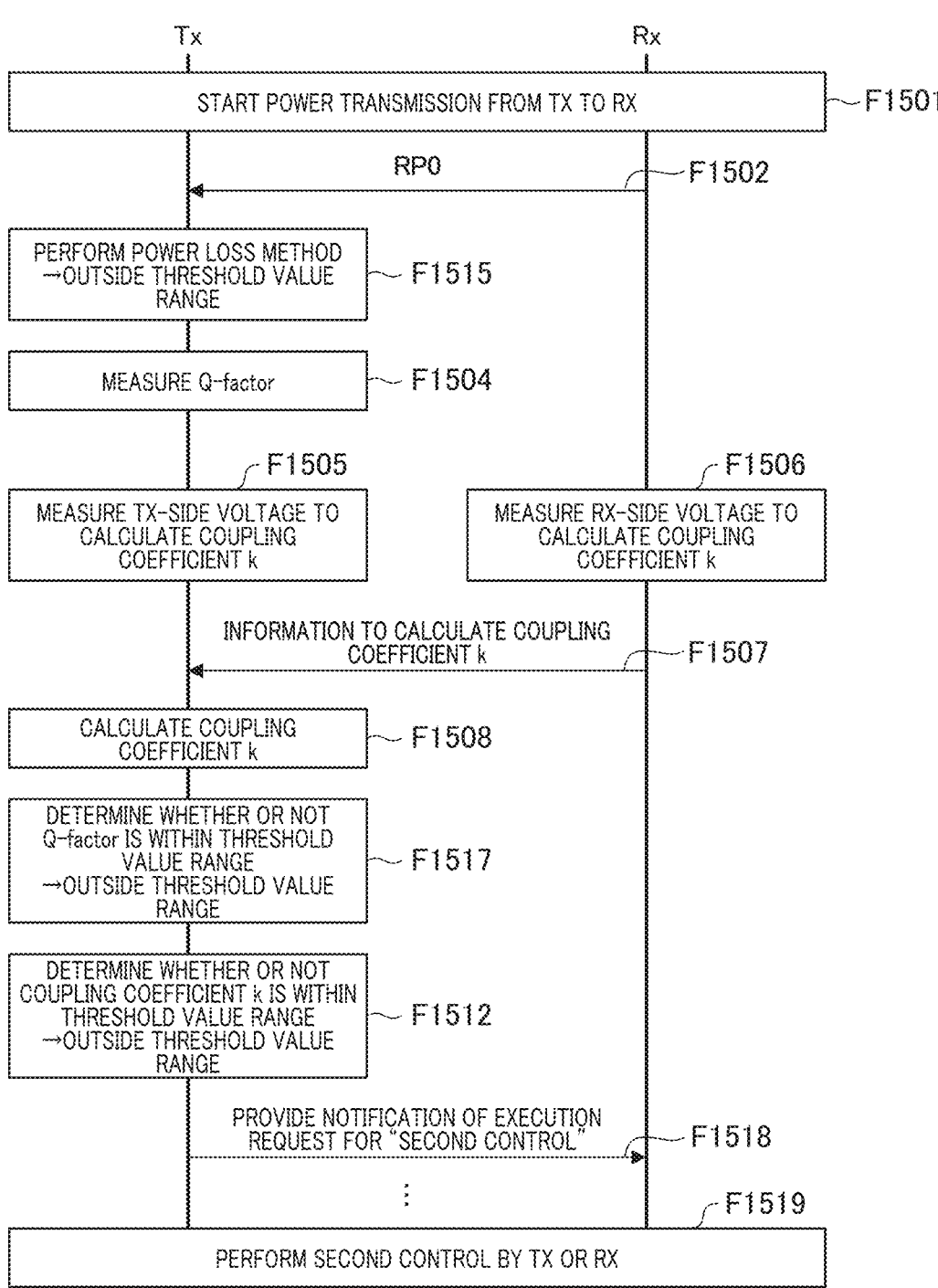
FIG. 20 is a sequence diagram for explaining yet another example of an operation according to the second embodiment.

Next, an example in FIG. 20 will be described. F1517, F1518, and F1519 which are differences from those in FIG. 19 will be described. After F1508, the processing proceeds to F1517. In F1517, TX determines that the value of the Q-factor is outside the first threshold value range. After F1517, the processing proceeds to F1512 and further to F1518. In F1518, TX notifies RX of an execution request for the second control. After F1518, TX or RX performs the second control in F1519. In the example in FIG. 20, according to the determination result of each of the Power Loss method and the method of measuring the coupled state capable of detecting positional deviation between the power transmitting antenna and the power receiving antenna, the measurement value is outside the threshold value range. In other words, the measurement values in all the three methods capable of performing detection in a case where a foreign matter (a metal piece or the like) is mixed between TX and RX are the outside the threshold value ranges. This indicates that "there is abnormality" or "there is a high probability that there is a foreign matter". Therefore, in F1518, TX notifies RX of the execution request for the second control. In F1519, the second control, that is, control of addressing the mixing of the foreign matter between the power transmitting antenna and the power receiving antenna is performed.

Next, an example that does not correspond to FIGS. 17 to 20 will be described. A case where the value of the Q-factor is outside the first threshold value range and the value of the coupling coefficient k is within the second threshold value range is assumed. In this case, since the value of the Q-factor is outside the first threshold value range, TX determines that there is a probability of mixing of a foreign matter on the power transmitting antenna and performs the second control. Alternatively, TX and RX perform remeasurement of the coupling coefficient k and the Q-factor.

A case where the received power value of RX is within the threshold value range, the value of the Q-factor is outside the first threshold value range, and the value of the coupling coefficient k is outside the second threshold value range is assumed. In this case, TX determines that there is a probability of mixing of a foreign matter on the power transmitting antenna, and the second control is performed. Alternatively, TX and RX perform remeasurement of the coupling coefficient k and the Q-factor.

A case where the received power value of RX is outside the threshold value range, the value of the Q-factor is within the first threshold value range, and the value of the coupling coefficient k is within the second threshold value range is assumed. In this case, TX determines that there is a probability of mixing of a foreign matter on the power transmitting antenna or there is a probability of occurrence of positional deviation between the power transmitting antenna and the power receiving antenna. The first or second control or the first and second control is performed. Alternatively, TX and RX perform remeasurement of the coupling coefficient k and the Q-factor.

Figure 21:
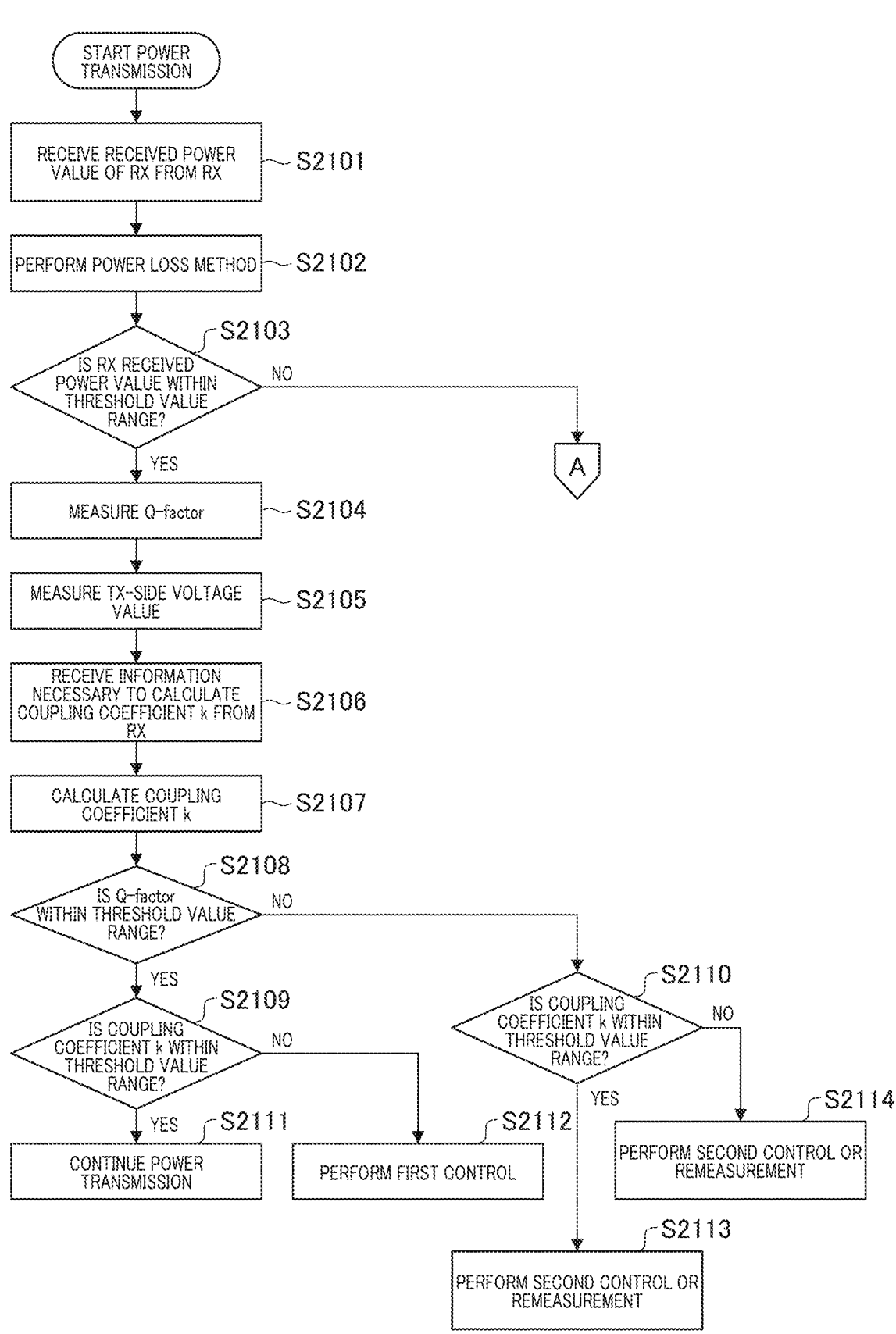
FIG. 21 is a flowchart for explaining processing of a power transmitting device according to the second embodiment.
Figure 22:
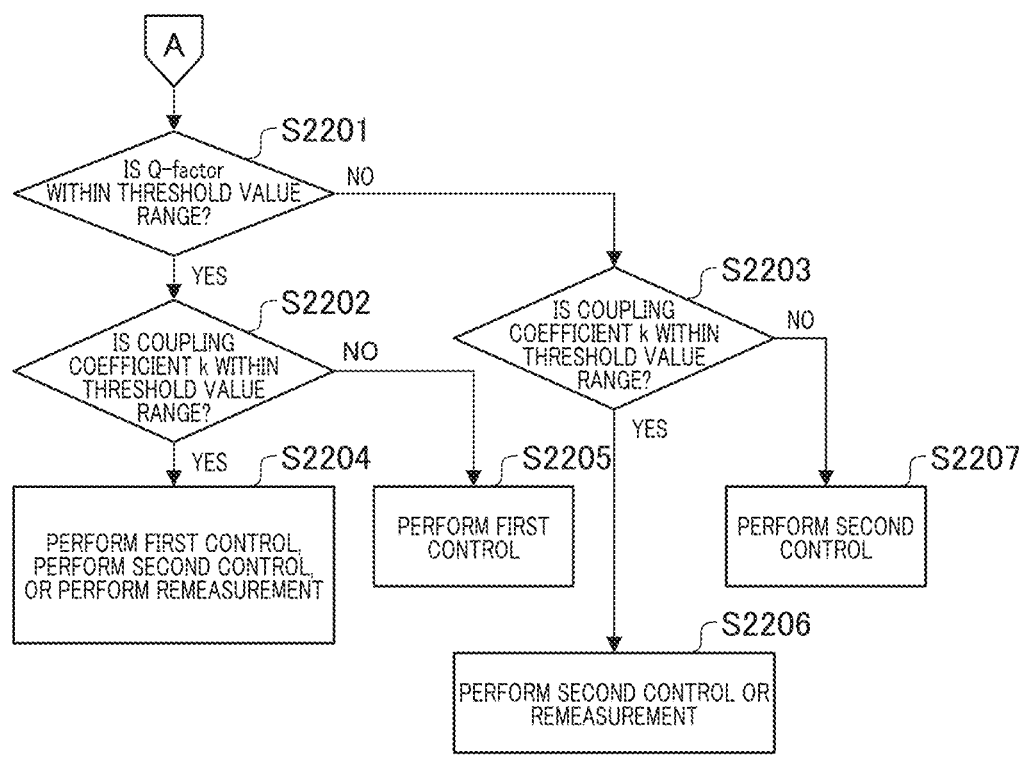
FIG. 22 is a flowchart illustrating processing continuing from FIG. 21.
Figure 23:
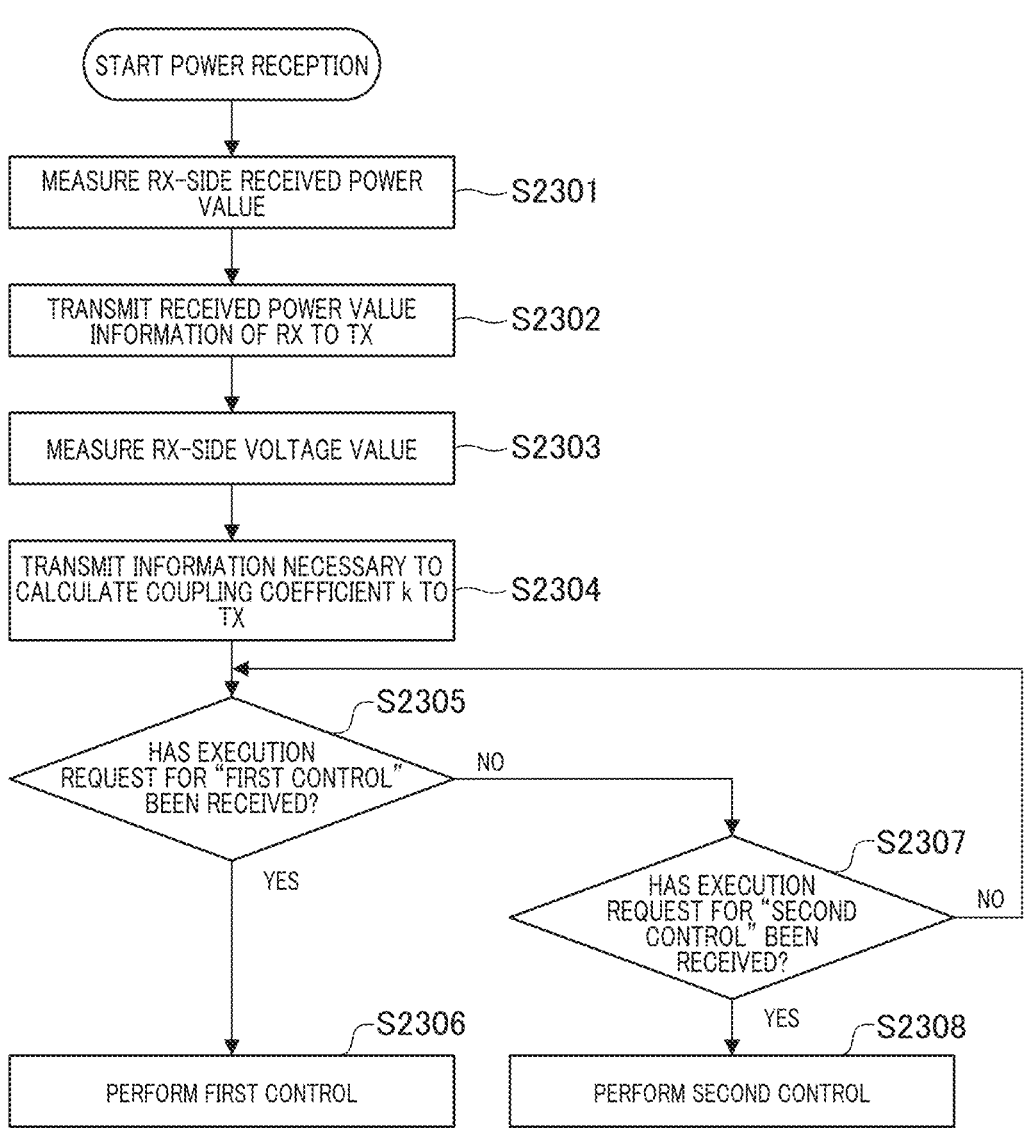
FIG. 23 is a flowchart for explaining processing of a power receiving device according to the second embodiment.

FIGS. 21 to 23 are flowcharts for explaining an operation example in the present embodiment. FIGS. 21 and 22 are flowcharts for explaining operations of TX in the present embodiment. FIG. 23 is a flowchart for explaining operations of RX in the present embodiment.

In FIG. 21, TX receives information regarding the power reception voltage value from RX in S2101 after power transmission is started, and TX performs the Power Loss method in S2102. Next, in S2103, TX determines whether or not the power reception voltage value of RX is within the threshold value range. In a case where it is determined that the power reception voltage value of RX is within the threshold value range, the processing proceeds to S2104. Also, in a case where it is determined that the power reception voltage value of RX is not within the threshold value range, the processing proceeds to S2201 in FIG. 22.

In S2104, TX measures the Q-factor. In S2105, TX measures the voltage value. In S2106, TX receives information necessary to calculate the coupling coefficient k from RX. In S2107, TX calculates the value of the coupling coefficient k. Then, in S2108, TX determines whether or not the measurement value of the Q-factor satisfies the first condition (the measurement value is within the first threshold value range). The processing proceeds to S2109 in a case where the first condition is satisfied, or the processing proceeds to S2110 in a case where the first condition is not satisfied.

In S2109, TX determines whether or not the value of the coupling coefficient k satisfies the second condition (the k value is within the second threshold value range). The processing proceeds to S2111 in a case where the second condition is satisfied, or the processing proceeds to S2112 in a case where the second condition is not satisfied. In S2112, TX continues power transmission to RX. Also, in S2112, TX performs the first control.

In S2110, TX determines whether or not the value of the coupling coefficient k satisfies the second condition. The processing proceeds to S2113 in a case where the second condition is satisfied, or the processing proceeds to S2114 in a case where the second condition is not satisfied. In S2113 and S2114, the second control is performed, or remeasurement of the coupling coefficient k and the Q-factor is performed. For example, the second control is performed in S2113, and the remeasurement of the coupling coefficient k and the Q-factor is performed in S2114.

Next, a case where the processing proceeds from S2103 in FIGS. 21 to S2201 in FIG. 22 will be described. In S2201, TX determines whether or not the measurement value of the Q-factor satisfies the first condition. The processing proceeds to S2202 in a case where the first condition is satisfied, or the processing proceeds to S2203 in a case where the first condition is not satisfied.

In S2202, TX determines whether or not the value of the coupling coefficient k satisfies the second condition. The processing proceeds to S2204 in a case where the second condition is satisfied, or the processing proceeds to S2205 in a case where the second condition is not satisfied. In S2204, TX performs the first control, second control, or remeasurement of the coupling coefficient k and the Q-factor. Also, in S2205, TX performs the first control.

In S2203, TX determines whether or not the value of the coupling coefficient k satisfies the second condition. The processing proceeds to S2206 in a case where the second condition is satisfied, or the processing proceeds to S2207 in a case where the second condition is not satisfied. In S2206, TX performs the second control or the remeasurement of the coupling coefficient k and the Q-factor. Also, in S2207, TX performs the second control.

On the other hand, RX measures the received power value in S2301 after power reception is started, and RX transmits information regarding the received power value to TX in S2302 in FIG. 23. RX measures the voltage value in S2303, and RX transmits information necessary to calculate the coupling coefficient k to TX in S2304. Then, the processing proceeds to S2305. In S2305 to S2308, RX performs control in response to the execution request from TX. Since the processing in S2305 to S2308 are similar to the processing in S1604 to S1607 in FIG. 16, description thereof will be omitted.

In the present embodiment, it is possible to enhance determination accuracy related to state detection by combining measurement results based on the three methods during power transmission from TX to RX, and it is possible to perform more appropriate control on the basis of the plurality of determination results.

Modification Examples

Hereinafter, modification examples of the embodiments will be described. In a first modification example of the first embodiment, the result of the Q factor measuring method is not taken into consideration, the detection of the states of TX and RX is performed by the method of measuring the coupled state between the power transmitting antenna and the power receiving antenna, and TX and RX perform control in accordance with the detection result. For example, in a case where the value of the coupled state indicator obtained by the method of measuring the coupled state is within a predetermined threshold value range, TX performs control to continue the power transmission. On the other hand, in a case where the value of the coupled state indicator is outside the predetermined threshold value range, TX or RX performs the first or second control.

The first control is control performed in a case where there is a high probability of positional deviation between the power transmitting antenna and the power receiving antenna. The second control is control performed in a case where there is a high probability that a foreign matter is present between the power transmitting antenna and the power receiving antenna. For example, the fifth control content is performed in the first control, and the second control content is performed in the second control. It is possible to perform appropriate control in accordance with a situation by different control content being performed in the first control and the second control.

Also, although the first to fifth control content has been described in regard to the first control, it is possible to combine a plurality of kinds of control content from the five control content. For example, TX and RX perform the first control content and the second control content in the first control in combination. It is also possible to perform a plurality of kinds of control content in combination from the first to fifth control content in regard to the second control as well.

In a second modification example of the second embodiment, it is determined that the states of TX and RX are normal in a case where the measurement result of the received power value obtained by the Power Loss method, for example, from among the three methods is within the threshold value range. In this case, the waveform decay method and the method of measuring the coupled state between the power transmitting antenna and the power receiving antenna are not performed. On the other hand, in a case where the measurement result of the received power value obtained by the Power Loss method is outside the threshold value range, it is determined that "there is a probability of abnormality" in the states of TX and RX. Then, the waveform decay method and the method of measuring the coupled state are performed, and it is thus possible to perform the state detection with higher accuracy.

In the second modification example, the measurement is performed on the basis of the three methods during the power transmission, and control of TX and RX is performed in accordance with the measurement result. In this case, the measurement result obtained by the waveform decay method is not taken into consideration, the state detection of TX and RX is performed using the remaining two methods, and control of TX and RX is performed in accordance with the state detection result. For example, in a case where the measurement result obtained by the Power Loss method is within the threshold value range and the measurement result obtained by the method of measuring the coupled state is within the threshold value range, TX continues the power transmission. Also, in a case where the measurement result obtained by the Power Loss method or the method of measuring the coupled state is outside the threshold value range, TX or RX performs first or second control. Moreover, in a case where both the measurement results obtained by the Power Loss method and the method of measuring the coupled state are outside their threshold value ranges, TX or RX performs the first or second control.

Also, in a case where the measurement results obtained by the Power Loss method and the waveform decay method are not taken into consideration and only the method of measuring the coupled state is used, the control of the TX and RX is performed in accordance with the result of the state detection of TX and RX. For example, in a case where the measurement result obtained by the method of measuring the coupled state is within the threshold value range, TX continues the power transmission. In a case where the measurement result obtained by the method of measuring the coupled state is outside the threshold value range, TX or RX performs the first or second control.

In the second modification example, measurement based on the three methods is performed, and in a case where the measurement method of any of the methods is outside the threshold value range, TX stops the power transmission to RX and executes the CAL processing. In the first or second control, it is possible to execute any of the CAL processing based on the Power Loss method, the CAL processing based on the waveform decay method, and the CAL processing based on the method of measuring the coupled state in combination. Alternatively, the three kinds of CAL processing may be executed.

Some (or all in some cases) of the configurations in the embodiments may be replaced with other configurations having similar functions or may be omitted, and other configurations may be added. Also, the present disclosure is not limited to the WPC standard and can be applied to other schemes such as an electromagnetic induction scheme, a magnetic field resonance scheme, an electric field resonance scheme, a microwave scheme, and a scheme using a laser.

In the embodiments, the plurality of detection methods are performed in the state detection of the power transmitting antenna and the power receiving antenna, and a result of measuring an indicator representing a decayed state of quality coefficient or a power transmission state of the power transmitting antenna and a result of measuring an indicator representing an electromagnetically coupled state of both the antennas are acquired. It is possible to perform the first control of addressing positional deviation between both the antennas and the second control of addressing an object that may affect the wireless power transmission.

Also, the power transmitting device and the power receiving device may be, for example, image input devices such as imaging devices cameras or video cameras) or scanners or may be image output devices such as printers, copy machines, or projectors. Also, the power transmitting device and the power receiving device may be storage devices such as hard disk devices or memory devices or may be information processing devices such as personal computers (PC) or smartphones.

Moreover, the power receiving device according to the present disclosure may be an information terminal device. For example, the information terminal device includes a display unit (display), to which power received from a power receiving antenna is supplied, which displays information for the user. Note that the power received through the power receiving antenna is accumulated in a power accumulation unit (battery), and power is supplied from the battery to the display unit. In this case, the power receiving device may include a communication unit that communicates with another device that is different from the power transmitting device. The communication unit may be compatible with communication standards such as the NFC communication and the fifth generation mobile communication system (5G).

Also, the power receiving device according to the present disclosure may be a vehicle such as an automobile. For example, an automobile that is the power receiving device may be adapted to receive power from a charger (power transmitting device) via a power transmitting antenna installed in a parking lot. Also, the automobile that is the power receiving device may be adapted to receive power from a charger (power transmitting device) via a power transmitting antenna buried in a road. In such an automobile, the received power is supplied to a battery. The battery power may be supplied to an activation unit (a motor or an electric motor unit) that drives wheels or may be used to drive a sensor used for drive assistance or to drive a communication unit that performs communication with an external device. In other words, the power receiving device may have, in addition to the wheels, a battery, a motor that performs driving using received power, a sensor, and further a communication unit that performs communication with a device other than the power transmitting device in this case. Furthermore, the power receiving device may include an accommodating unit that accommodates persons. Examples of the sensor include a sensor used to measure an inter-vehicle distance and a distance from another barrier. The communication unit may be compatible with a global positioning system; global positioning satellite (GPS), for example. In addition, the communication unit may be compatible with a communication standard such as the fifth generation mobile communication system (5G). Also, the vehicle may be a bicycle or a motorcycle.

In addition, the power receiving device according to the present disclosure may be an electric tool or a home appliance product. Such a device which is the power receiving device may include, in addition to a battery, a motor that is driven by received power accumulated in the battery. Also, such a device may include a notification mechanism that provides a notification of a remaining amount of the battery or the like. Moreover, such a device may include a communication unit that communicates with another device that is different from the power transmitting device. The communication unit may be compatible with communication standards such as NFC and the fifth generation mobile communication system (5G).

Also, the power transmitting device according to the present disclosure may be an in-vehicle charger that transmits power to a mobile information terminal device such as a smartphone or a tablet that is compatible with wireless power transmission inside a vehicle such as an automobile. Such an in-vehicle charger may be provided at any part inside the automobile. For example, the in-vehicle charger may be mounted on a console of the automobile or may be mounted on an instrument panel (an instrument panel or a dashboard), at a position between passenger seats, or on a ceiling or a door. However, it is preferable that the power transmitting device be not mounted on a location where driving is disturbed. Also, although the example in which the power transmitting device is an in-vehicle charger has been described, the power transmitting device is not limited to such a charger disposed in a vehicle and may be mounted in transport machines such as a train, an aircraft, and a ship. The charge in such a case may also be mounted at a position between passenger seats or on the ceiling or a door.

The vehicle such as an automobile including the in-vehicle charger may be a power transmitting device. In such a case, the power transmitting device includes wheels and a battery and supplies power to the power receiving device through a power transmission circuit unit and a power transmitting antenna using battery power.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. (Cross-Reference of Related Applications)

What is claimed is:

1. A power receiving device comprising:
a power receiving unit configured to receive power wirelessly from a power transmitting device;
a receiving unit configured to receive first information related to a voltage of an inverter included in the power transmitting device from the power transmitting device; and
a transmitting unit configured to transmit a specific signal to the power transmitting device on the basis of second information which is determined on the basis of a plurality of specific indicators calculated a plurality of times, wherein the specific indicator is calculated on the basis of the first information and the power transmitting device that has received the specific signal restricts the voltage of the inverter.

2. The power receiving device according to claim 1, wherein the second information is determined on the basis of the first information and third information related to a voltage rectified by the power receiving device.

3. The power receiving device according to claim 2, wherein the third information is information related to an output voltage of a rectifier included in the power receiving device.

4. The power receiving device according to claim 2, wherein the third information is information related to an output voltage of a rectifier included in the power receiving device, the output voltage being measured in a light load state.

5. The power receiving device according to any one of claims claim 1, wherein the first information is information related to the voltage of the inverter measured in a light load state.

6. The power receiving device according to claim 1, wherein the specific indicator is an indicator representing coupling between a power transmitting coil included in the power transmitting device and a power receiving coil included in the power receiving device.

7. A method for a power receiving device comprising:
receiving power wirelessly from a power transmitting device;
receiving first information related to a voltage of an inverter included in the power transmitting device from the power transmitting device; and
transmitting a specific signal to the power transmitting device on the basis of second information which is determined on the basis of the first information a plurality of specific indicators calculated a plurality of times, wherein the specific indicator is calculated on the basis of the first information and the voltage of the inverter is restricted by the power transmitting device that has received the specific signal.

8. A non-transitory storage medium storing a program of a power receiving device causing a computer to perform a method for the power receiving device, the method comprising:

receiving power wirelessly from a power transmitting device;

receiving first information related to a voltage of an inverter included in the power transmitting device from the power transmitting device; and transmitting a specific signal to the power transmitting device on the basis of second information which is determined on the basis of a plurality of specific indicators calculated a plurality of times, wherein the specific indicator is calculated on the basis of the first information and the voltage of the inverter is restricted by the power transmitting device that has received the specific signal.

9. A power transmitting device comprising:

a power transmitting unit configured to transmit power wirelessly to a power receiving device;

a transmitting unit configured to transmit first information related to a voltage of an inverter included in the power transmitting device to the power receiving device;

a receiving unit configured to receive a specific signal from the power receiving device that determines second information determined on the basis of the first information a plurality of specific indicators calculated a plurality of times, wherein the specific indicator is calculated on the basis of the first information; and a restricting unit configured to restrict the voltage of the inverter in a case where the specific signal is received.

10. A method for a power transmitting device comprising:

transmitting power wirelessly to a power receiving device;

transmitting first information related to a voltage of an inverter included in the power transmitting device to the power receiving device;

receiving a specific signal from the power receiving device that determines second information determined on the basis of a plurality of specific indicators calculated a plurality of times, wherein the specific indicator is calculated on the basis of the first information; and restricting the voltage of the inverter in a case where the specific signal is received.

11. A non-transitory storage medium storing a program of a power transmitting device causing a computer to perform a method for the power transmitting device, the method comprising:

transmitting power wirelessly to a power receiving device;

transmitting first information related to a voltage of an inverter included in the power transmitting device to the power receiving device;

receiving a specific signal from the power receiving device that determines second information determined on the basis of the first information a plurality of specific indicators calculated a plurality of times, wherein the specific indicator is calculated on the basis of the first information; and restricting the voltage of the inverter in a case where the specific signal is received.

\* \* \* \* \*